United States Patent
Sui et al.

(10) Patent No.: US 12,292,041 B2
(45) Date of Patent: May 6, 2025

(54) METHOD AND SYSTEM FOR TRANSPORTATING FLUID, AND DEVICE EMPLOYING SYSTEM AND METHOD

(71) Applicant: MGI Tech Co., Ltd., Shenzhen (CN)

(72) Inventors: Xiangkun Sui, Shenzhen (CN); Chutian Xing, Shenzhen (CN); Joon Mo Yang, Sanjose, CA (US); Greg Bogdan, San Jose, CA (US); Simon Robert Adams, San Jose, CA (US)

(73) Assignee: MGI Tech Co., Ltd., Shenzhen (CN)

( * ) Notice: Subject to any disclaimer, the term of this patent is extended or adjusted under 35 U.S.C. 154(b) by 514 days.

(21) Appl. No.: 17/763,266

(22) PCT Filed: Sep. 24, 2019

(86) PCT No.: PCT/CN2019/107591
§ 371 (c)(1),
(2) Date: Mar. 24, 2022

(87) PCT Pub. No.: WO2021/056207
PCT Pub. Date: Apr. 1, 2021

(65) Prior Publication Data
US 2022/0341407 A1    Oct. 27, 2022

(51) Int. Cl.
F04B 27/14    (2006.01)
F04B 41/02    (2006.01)
(Continued)

(52) U.S. Cl.
CPC ............. *F04B 27/14* (2013.01); *F04B 41/02* (2013.01); *F04B 41/06* (2013.01); *F04B 49/22* (2013.01); *F04C 2/08* (2013.01)

(58) Field of Classification Search
CPC .......... F04B 27/14; F04B 41/02; F04B 41/06; F04B 43/02; F04B 43/12; F04B 49/22; F04C 2/08
See application file for complete search history.

(56) References Cited

U.S. PATENT DOCUMENTS 4,714,545 A  * 12/1987  Bente .................. G05D 11/001
                                                              417/5
5,215,715 A     6/1993   Haswell et al.
(Continued)

FOREIGN PATENT DOCUMENTS

CN     102426261        4/2012
CN     102426261 A      4/2012
(Continued)

OTHER PUBLICATIONS

Zhang An-Liang, Priority Scheduling of Microfluidic Droplets in Digital Microfluidics-Based Biochips, «Chinese Journal of Electron Device»,Aug. 2008, pp. 1327-1330, vol. 31 No. 4,Ningbo Zhejiang 315211, China.

*Primary Examiner* — Bryan M Lettman
(74) *Attorney, Agent, or Firm* — ScienBiziP, P.C.

(57) ABSTRACT

A fluid transportation system and method use a negative pressure driving mode to absorb fluids from a fluid storage assembly and a positive pressure driving mode to load the absorbed fluids into the fluid-using system. At least two working modules are used to transport fluids to the fluid-using system, the process of transporting fluid in each working module being divided into the processes of absorbing fluids into a fluid transfer assembly, and loading fluids into a fluid transfer assembly. The process of absorbing fluids in each working module and the processes of absorbing fluids and/or loading fluids in any other working module overlap at least partially along the time axis. With the present disclosure, the accuracy and speed of fluids transportation are improved, a device utilizing the system and method is also disclosed.

18 Claims, 11 Drawing Sheets

(51) Int. Cl.
   *F04B 41/06*      (2006.01)
   *F04B 49/22*      (2006.01)
   *F04C 2/08*       (2006.01)

(56) References Cited

U.S. PATENT DOCUMENTS

| | | | | |
|---|---|---|---|---|
| 5,308,583 | A * | 5/1994 | Sanuki | G01N 30/34 |
| | | | | 422/514 |
| 6,228,153 | B1 * | 5/2001 | Saitoh | G01N 30/28 |
| | | | | 417/313 |
| 8,241,013 | B2 * | 8/2012 | Moeller | F04B 7/0007 |
| | | | | 417/532 |
| 2004/0028565 | A1 | 2/2004 | Abou-Saleh et al. | |
| 2007/0068573 | A1 | 3/2007 | Cox et al. | |
| 2009/0280559 | A1 | 11/2009 | McCarthy | |
| 2012/0285554 | A1 * | 11/2012 | Lohkamp | F04B 39/10 |
| | | | | 137/565.11 |

FOREIGN PATENT DOCUMENTS

| | | |
|---|---|---|
| JP | 2011524527 | 9/2011 |
| WO | 2019104580 | 6/2019 |
| WO | 2019104580 A1 | 6/2019 |

* cited by examiner

METHOD AND SYSTEM FOR TRANSPORTATING FLUID, AND DEVICE EMPLOYING SYSTEM AND METHOD

FIELD

The subject matter herein generally relates to the field of fluid control, and more particularly, to a fluid transportation system, a fluid transportation method, and a fluid using device applying the system or the method.

BACKGROUND

In fields of biology, chemistry, and medicine, common instruments are designed based on core principles of biological or chemical reactions. Substances (such as reagents) that participate in the biological or chemical reactions are usually liquid or gaseous in physics, and are collectively referred to as fluids. In order to allow such an instrument to realize the biological or chemical reactions, some containers in the instrument are used as reaction cells for samples and fluids. A fluid transportation system, that can quantitatively transport different fluids to the reaction cells in sequence according to some requirements, is also needed in the instrument.

When designing a fluid transportation system, it is necessary to develop or select fluid-transportating components with suitable performances, and design a reasonable flow layout and operation logics to meet the requirements of the biological or chemical reactions in the instrument to velocity, pressure, precision, accuracy, flow pulsation, and so on.

In principle, the fluid transportation system drives the fluid to move by creating and maintaining a pressure gradient (pressure difference) between an upstream position to a downstream position along a flowing direction. Therefore, when driving the fluid to move, the main design ideas are divided into two types, namely positive pressure driving and negative pressure driving. The positive pressure driving refers to maintaining a stable and higher pressure source at the upstream position of the flow path, while the fluid at the downstream position has a free surface in contact with atmosphere, so that the pressure along the entire flow path is higher than an atmospheric pressure. The negative pressure driving refers to maintaining a stable and minimum pressure source at the downstream position of the flow path, while the fluid at the upstream position has a free surface in contact with atmosphere, pressure along the entire flow path is lower than atmospheric pressure and the fluid is thus drawn along. However, each of the positive pressure driving and the negative pressure drive will be restricted by various conditions in design.

When the negative pressure driving is used, a pipeline for fluid entry is generally placed upstream, the reaction cell is placed in the middle, and the equipment for creating and maintaining the pressure gradient is placed downstream. The negative pressure driving has great advantages for transporting various types of fluids into the reaction cells. The structure of the pipeline before the fluids enter the reaction cells is relatively simple and easy to clean, which reduces the risk of cross-contamination between different fluids. At present, most of the fluid transportation systems aiming at realizing single micro-quantity and high-precision transportation adopt this design. However, the disadvantage of negative pressure driving is that an ultimate pressure of the source of the negative pressure system is a vacuum pressure, so the ultimate pressure gradient is a standard atmospheric pressure, which limits the flow (that is, the maximum flow rate) of the fluid transportation system.

When the positive pressure driving is used, the pipeline for fluid entry is generally placed upstream, the reaction cell is placed downstream, and the compressed gas is applied on the free surface of the upstream fluid. The positive pressure driving has great advantages when the fluid needs to be quickly transported into the reaction cell. In theory, the pressure source of positive pressure driving has no upper limit of pressure, which can far exceed a standard atmospheric pressure, so the flow rate of the fluid transportation system can be much higher than that of the negative pressure driving in the same pipeline. At present, most of the fluid transportation systems aiming at realizing rapid transportation adopt positive pressure driving. However, the disadvantage of the positive pressure driving is that although the problem of cross-contamination of fluids can be avoided, the speed and accuracy of movement of the driven fluid are difficult to be controlled due to the high compressibility of gas.

SUMMARY

In order to solve some or all of the above-mentioned problems and other potential problems, it is necessary to provide a fluid transportation system, a fluid transportation method, and a fluid using device applying the system or the method.

The first aspect of the present application provides a fluid transportation system. The fluid transportation system uses a negative pressure driving mode to absorb fluids from a fluid storage assembly, and uses a positive pressure driving mode to load absorbed fluids into a fluid-using system.

The second aspect of the present application further provides a fluid transportation system including at least two working modules, each of which is configured to transfer at least one fluid from a fluid storage assembly of the fluid-using system, wherein a total time period for the at least two working modules to transfer at least two fluids from the fluid storage assembly to the fluid-using system is less than a total time period for each of the at least two working modules to transfer one fluid from the fluid storage assembly to the fluid-using system.

The third aspect of the present application provides a fluid transportation method, comprising:

absorbing fluids by a negative pressure driving mode; and loading the absorbed fluids into a fluid-using system by a positive pressure driving mode.

The fourth aspect of the present application further provides a fluid transportation method, comprising:

a) establishing a connection between a first working module and a fluid storage assembly, running the first working module to absorb fluids from the fluid storage assembly, and blocking the connection between the first working module and the fluid storage assembly after completion;

b) establishing a connection between a second working module and the fluid storage assembly or another fluid storage assembly, running the second working module to absorb fluids from the fluid storage assembly or another fluid storage assembly, and blocking the connection between the second working module and the fluid storage assembly or another fluid storage assembly after completion;

c) establishing a connection between the first working module and a fluid-using system, and running the first working module to load absorbed fluids into the fluid-using system; and d) establishing a connection between the second working module and the fluid-using system or another fluid-using system, and running the second working module to load absorbed fluids into the fluid-using system or the another fluid-using system;

wherein a total time period for the first working module and the second working module to transfer fluids from the fluid storage assembly or the another fluid storage assembly to the fluid-using system or the another fluid-using system is less than a sum of the time period spent by the first working module and the second working module respectively in transferring fluids from the fluid storage assembly or the another fluid storage assembly to the fluid-using system or the another fluid-using system.

The fifth aspect of the present application further provides a fluid transportation method, comprising:

absorbing a first fluid from a fluid storage assembly, time duration TA1;

loading the first fluid into a fluid-using system, time duration TA2;

absorbing a second fluid from the fluid storage assembly or another fluid storage assembly, time duration TB1;

loading the second fluid into the fluid-using system or the another fluid-using system, time duration TB2; wherein a total time period for transferring the first fluid is denoted as T, the second fluid from the fluid storage assembly or another fluid storage assembly to the fluid-using system or the another fluid-using system is less than a sum of the TA1, TA2, TB1, and TB2.

The sixth aspect of the present application further provides a fluid using device comprising any of the above-mentioned fluid transportation systems or any of the above-mentioned fluid transportation methods to transport fluids.

The fluid transportation system, method, and device of the present application, using a negative pressure driving mode to absorb fluids and using a positive pressure driving mode to load absorbed fluids into a fluid-using system, which ensures the quantitative accuracy of absorbing fluids from a fluid storage assembly, while ensuring faster delivery of fluids to the fluid-using system.

The fluid transportation system and method provided by the present application can simultaneously employ at least two working modules: a first working module and a second working module, and the first working module and the second working module transport at least two independent fluids from a fluid storage assembly to a fluid-using system. The total time period for the two working modules to transport the two fluids from the fluid storage assembly to the fluid-using system is denoted as T, the time required for the first working module to output a fluid out of the fluid storage assembly and input the fluid into the fluid-using system is denoted as TA, while the time required for the second working module to output another fluid from the fluid storage assembly and input the fluid into the fluid-using system is denoted as TB. The T is less than the sum of TA and TB, resulting in a shorter overall time for fluid transportation. In addition, multiple working modules are set up to transport fluids in groups, which avoids cross-contamination of fluids to the maximum extent. By filling the pipe space left after positive pressure transportation with a filling liquid, the quantitative accuracy of the fluid transportation is higher compared to using compressed gas.

BRIEF DESCRIPTION OF THE DRAWINGS

In order to explain the technical solutions of the present invention more clearly, the following briefly introduces the drawings according to the embodiments of the present invention. Obviously, the drawings in the following description are only some embodiments of the present invention. For those of ordinary skill in the art, other drawings can also be obtained from these drawings without any creative effort.

The following detailed description will further illustrate the present disclosure in conjunction with the above drawings.

DESCRIPTION OF SYMBOLS OF MAIN COMPONENTS

| | | | |
|---|---|---|---|
| fluid transportation system | 1, 61 | auxiliary module | 3 |
| working module | 2 | distribution assembly | 4 |
| fluid selection assembly | 21 | fluid transfer assembly | 22 |
| power assembly | 23 | storage assembly | 30 |
| fluid storage assembly | 31 | waste storage assembly | 32 |
| filling liquid storage assembly | 33 | fluid-using system | 5 |
| first type of interface | 231, 221, 211, 411 | second type of interface | 232, 222, 212, 412 |
| third type of interface | 233, 213 | syringe pump | 203, 20 |
| selection valve | 201, 201a | fluid transfer pipeline | 202 |
| fluid warehouse | 301, 301a, 301a' | waste bucket | 302 |
| filling liquid bucket | 303 | solenoid valve | 201b |
| distribution interface | 2031, 2032, 2033 | public port | 2011, 2011a, 2011b, 431 |
| position port | 2012, 2012b, 432 | container | R1~R4 |
| tee joint | 201c, 41 | one-way valve | 201d, 42 |
| syringe | 2034 | interface | 2011c, 2012c, 2013c, 411, 412, 413 |
| first working module | 2a | second working module | 2a' |
| first power assembly | 23a | first fluid selection assembly | 21a |
| first fluid transfer assembly | 22a | first syringe pump | 203a |
| first selection valve | 201a | first fluid transfer pipeline | 202a |
| second power assembly | 23a' | second fluid selection assembly | 21a' |
| second fluid transfer assembly | 22a' | second syringe pump | 203a' |
| second selection valve | 201a' | second fluid transfer pipeline | 202a' |
| step | S111-S112 | step | S121-S124 |
| step | S131-S134 | fluid using device | 6, 7 |
| fluid transportation method | 71 | | |

DETAILED DESCRIPTION

The technical solutions in the embodiments of the present disclosure will be clearly and completely described below with reference to the drawings. Obviously, the described embodiments are only a part of the embodiments of the present disclosure, but not all of the embodiments. Based on the embodiments of the present disclosure, all other embodiments obtained by those skilled in the art without creative effort shall fall within the scope of the present disclosure.

It should be noted that when a component is referred to as being "fixed on" or "mounted on" another component, it can be directly on the other component or there may also be an intervening component. When a component is considered to be "set on" another component, it may be in direct contact with the other component or there may also be an intervening component. As used herein, the term "and/or" includes all and any combinations of one or more of related listed items.

Figure 1:
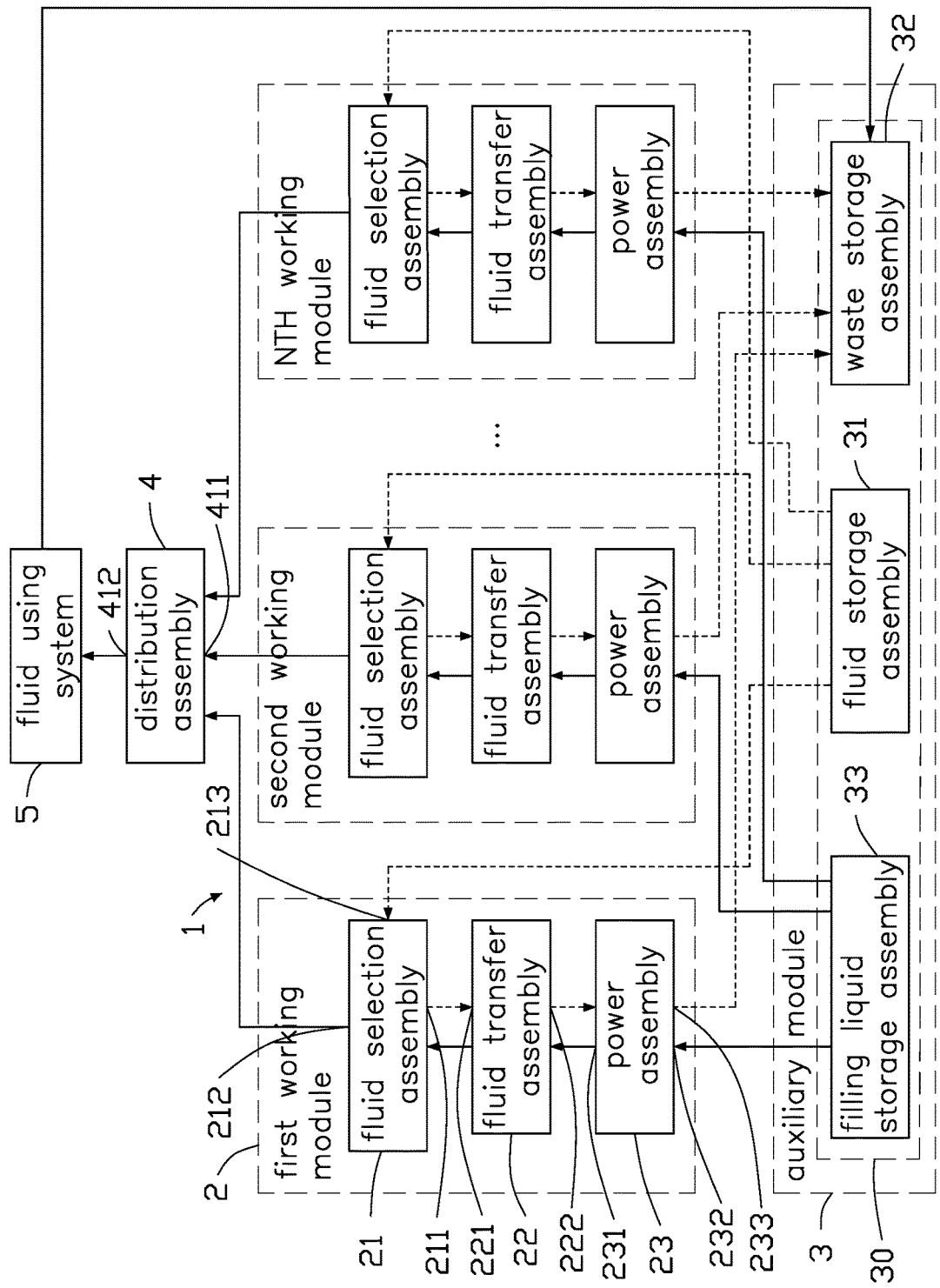
FIG. 1 is a block diagram of a fluid transportation system according to Embodiment I of the present disclosure.

Referring to FIG. 1, a fluid transportation system in an embodiment of the present disclosure is illustrated. The fluid transportation system 1 includes a working module 2, an auxiliary module 3, and a distribution assembly 4. The working module 2 is a functional unit that moves fluids in the fluid transportation system 1. The number of the working modules 2 can be one or more, and each working module 2 includes a fluid selection assembly 21, a fluid transfer assembly 22, and a power assembly 23. The auxiliary module 3 is a collection of all assemblies in the fluid transportation system 1 that assist the working module 2 in transporting fluids. The auxiliary module 3 includes a storage assembly. In this embodiment, the auxiliary module 3 includes three different types of storage assembly 30, namely, a fluid storage assembly 31, a waste storage assembly 32, and a filling liquid storage assembly 33. Each working module 2 is connected to the above three storage assemblies of the auxiliary module 3, the quantity of each storage assembly 30 may be one or more than one. In different embodiments, each storage assembly 30 can be used individually by some of the working modules 2 or can be used jointly by all the working modules 2. The distribution assembly 4 is an assembly that switches between different working modules 2 of the fluid transportation system 1 to transport fluids to a fluid-using system 5. When the fluid transportation system 1 has only one working module 2 to transport fluids to the fluid-using system 5, the distribution assembly 4 may be absent, and the working module 2 may be directly connected to the fluid-using system 5. When the fluid transportation system 1 has N working modules (N 2) to transport fluids to the fluid-using system 5, a distribution assembly 4 is required to connect different working modules 2 to the fluid-using system 5.

As shown in FIG. 1, the fluid-using system 5 refers to a system for moving fluids to obtain reactions, usually including a reaction cell and related auxiliary components and pipes, and is the destination of fluids moved by the fluid transportation system 1. The fluids entering the fluid-using system 5 are discharged into the waste storage assembly 32 of the auxiliary module 3 of the fluid transportation system 1 as waste (e.g., waste liquid) after being used in the system. The fluid-using system 5 is not a part of the fluid transportation system 1, so the fluid transport and alternative solutions of the fluid-using system are not described in this application.

The assemblies of the fluid transportation system 1 in this embodiment will be described in detail below.

The power assembly 23 is configured to create and maintain a pressure gradient (a pressure difference) within the fluid transportation system 1 to move fluids in the fluid transportation system 1. In this embodiment, the power assembly 23 has at least three types of fluid interfaces. A first type of interface 231 is connected to the fluid transfer assembly 22, and the number of first type interfaces 231 is determined by the number of fluid transfer assemblies 22 to which the power assembly 23 is connected. A second type of interface 232 is connected to the filling liquid storage assembly 33, and the number of the second type of interfaces 232 is determined by the number of paths used by all the filling liquid storage assemblies 33 to which the power assembly 23 is connected. A third type of interface 233 is connected to the waste storage assembly 32, and the number of the third type of interfaces 233 is determined by the number of paths used by all the waste storage assemblies 32 to which the power assembly 23 is connected. In this embodiment, the power assembly 23 can drive fluids to move in both forward and reverse directions, the forward direction refers to the direction in which the fluid flows from the power assembly 23 to the fluid transfer assembly 22, and the reverse direction refers to the direction in which the fluid flows from the fluid transfer assembly 22 to the power assembly 23. When the power assembly 23 drives fluids to flow forward, the power assembly 23 communicates with the fluid transfer assembly 22 and the filling liquid storage assembly 33, so that a filling liquid stored in the filling liquid storage assembly 33 can infill the space left after movement of the fluids. When the power assembly 23 drives in reverse, the power assembly 23 is connected to the fluid transfer assembly 22 and the waste storage assembly 32, so that excess fluids flows into the waste storage assembly 32 as waste. In this embodiment, the power assembly 23 may be various types of pumps for moving fluids, such as a syringe pumps, plunger pumps, diaphragm pumps, gear pumps, and peristaltic pumps.

The fluid transfer assembly 22 is configured to store fluids that are to be changed in direction. In this embodiment, the fluid transfer assembly 22 should have at least two interfaces, with one interface 221 connecting to the fluid selection assembly 21 and the other interface 222 connecting to the power assembly 23. In this embodiment, the fluid transfer assembly 22 not only supports the power assembly 23 to drive fluids in both forward and reverse directions, but also supports temporary storage of the fluids that have a changed flow direction. Therefore, the fluids can enter from any one of the two interfaces 221 and 222 of the fluid transfer assembly 22 and flow out from the other interface. The fluid transfer assembly 22 can be a container or pipe with a specific specification or it can be a syringe.

The fluid selection assembly 21 is configured for interconnecting different assemblies connected to the fluid selection assembly 21, thereby setting path selection of the fluid to be moved. In this embodiment, each fluid selection assembly 21 has three types of interfaces connected to different assemblies, a first type of interface 211 is connected to the fluid transfer assembly 22, and the number of the first type of interfaces 211 is determined by the number of the connected fluid transfer assembly 22. A second type of interface 212 is connected to a distribution assembly 4, the number of the second type of interfaces 212 depends on the number of paths that the fluid selection assembly 21 needs to connect to the distribution assembly 4, the number of the paths is usually 1. A third type of interface 213 is connected to a container for storing fluids in the fluid storage assembly 31. The third type of interface 213 of each fluid selection assembly 21 can only correspond to one container for storing fluids, and the same container for storing fluids can be simultaneously connected to a different third type of interface 213 of the same fluid selection assembly 21 or to the third type of interface 213 of a different fluid selection assembly 21. As long as a fluid storage container of the fluid storage assembly 31 is connected to a third type interface 213 of the fluid selection assembly 21, a path to the fluid-using system 5 can be established to transport the fluids in the container to the fluid-using system 5. The fluid selection assembly 21 can communicate with a first type of interface 211 and a third type of interface 213, and communicate with a first type of interface 211 and a second type of interface 212 as required. In this embodiment, the fluid selection assembly 21 may be various types of solenoid valves, selection valves (e.g. rotary valves), or a set of multiple solenoid valves and/or selection valves as required, or solenoid valve or selector valve heads configured by a syringe pump for switching between different interfaces.

The distribution assembly 4 is configured to interconnect different assemblies connected to the distribution assembly 4, thereby selecting the path or paths of the fluids in the fluid transportation system 1. In this embodiment, the distribution assembly 4 communicates with different working modules 2 with the fluid-using system 5 as required. Therefore, the distribution assembly 4 has two types of interfaces connected to different assemblies, and a first type of interface 411 is connected to the fluid selection assembly 21, the number of first type interfaces 411 is determined by the number of paths of the fluid selection assemblies 21 connected to the distribution assembly 4; a second type interface 412 is connected to a fluid-using system 5, and the number of second type interface 412 depends on the number of paths the fluid-using system 5 needs to connect to the distribution assembly 4. The distribution assembly 4 can communicate with a first type of interface 411 and a second type of interface 412 as required during operations. In this embodiment, the distribution assembly 4 may be various types of solenoid valves, selection valves, or a set of multiple solenoid valves and/or s selection valves as required.

The fluid storage assembly 31 is configured to store fluids transported to the fluid-using system 5. The number of the fluid storage assemblies 31 can be one or more, each fluid storage assembly 31 stores part or all of the fluids that need to be transported according to the needs of the fluid-using system 5, and all the fluid storage assemblies 31 can store all of the fluids that need to be transported to the fluid-using system 5, according to needs of the fluid-using system 5. Each fluid storage assembly 31 may contain one or more fluid storage containers, each fluid storage container stores a fluid, and the containers may be connected to at least one fluid selection assembly 21 by at least one pipe. The fluid storage assembly 31 may include containers of different sizes and materials, and, as required, may also include a fine-bore needle and pipe for fluid extraction, a mechanism for controlling the lifting and lowering of the needle, and related components such as temperature control components for storage conditions.

The filling liquid storage assembly 33 is configured for storing a filling liquid. In this embodiment, the number of the filling liquid storage assemblies 33 can be one or more, and each filling liquid storage assembly 33 can supply a filling liquid to one or more power assemblies 23, and each power assembly 23 needs at least one filling liquid storage assembly 33 to provide the filling liquid. Each power assembly 23 may use one or more filling liquids. Each filling liquid storage assembly 33 may include one or more containers for storing filling liquids, each container stores one filling liquid, and the container may be connected to at least one power assembly 23 by at least one pipe. The filling liquid is a special fluid required by the positive pressure fluid system. Due to the need for the positive pressure fluid movement, when a working module 2 loads fluids to a fluid-using system 5 through a distribution assembly 4, the filling liquid needs to enter the fluid transportation system 1 to infill a space left after the fluid being transported has moved on, to keep the fluid system of the working module 2 full of fluid, thereby maintaining a pressure gradient. The filling liquid is non-reactive in relation to the fluids transported by the working module 2. In this embodiment, the filling liquid storage assembly 33 may include containers of different sizes and materials, and, as required, may also include a needle and pipe for extracting the filling liquid, a mechanism for controlling the lifting and lowering of the needle, and related components such as temperature control components for storage conditions.

The waste storage assembly 32 is configured to store discharged waste fluid from the fluid transportation system 1 and/or the fluid-using system 5. In this embodiment, there may be one or more waste storage assemblies 32, and each waste storage assembly 32 may store the waste discharged from one or more power assemblies 23 and/or the waste discharged from the fluid-using system 5. Each waste storage assembly 32 includes one or more containers for waste storage, and each container may be connected to the fluid-using system 5 or the power assembly 23 by at least one pipe. In this embodiment, the waste storage assembly 32 may include containers of different sizes and materials, and, as required, may also include a sensor for detecting liquid levels, a filter membrane for filtering odors, and related components such as carts for transferring the container.

The above is a detailed description and introduction of the functional modules and assemblies of the fluid transportation system 1. The working process of the fluid transportation system 1 will be described below.

In the fluid transport system 1, each working module 2 transports fluids in the same way, and through the cooperation of the auxiliary modules 3, a certain fluid is transported from the fluid storage assembly 31 to a certain fluid-using system 5. Since the number of working modules 2 of the fluid transportation system 1 can be one or more, when different numbers of working modules 2 are used for fluid transportation, the working processes of the fluid transportation system 1 are separately described in relation to the different numbers of working modules 2.

As shown in FIG. 1, the specific process of transporting fluids in each working module can be divided into two steps, namely, step 1 and step 2, respectively represented by connecting lines with arrows in FIG. 1.

Step 1 is represented by a dotted line with arrows, representing the process of transporting fluids from the fluid storage assembly 31 to the fluid transfer assembly 22 by means of negative pressure driving. When performing step 1, the fluid selection assembly 21 of the working module 2 is first used to connect the fluids to be used with the fluid transfer assembly 22 of the working module 2, and at the same time the power assembly 23 of the working module 2 communicates with the waste storage assembly 32, forming a passage starting from the fluid storage assembly 31 and passing through the fluid selection assembly 21, the fluid transfer assembly 22, the power assembly 23 and the waste storage assembly 32 in sequence. After that, the power assembly 23 is activated, and a pressure gradient is created in the passage, so that the fluids flow out of the fluid storage assembly 31 and enters the fluid transfer assembly 22 through the fluid selection assembly 21. While the fluids are transported along the above-mentioned passage, the fluids discharged from the above-mentioned passage are discharged into the waste storage assembly 32 as waste through the power assembly 23 for storage.

Step 2 is represented by a solid line with arrows, representing the process of transporting the fluids from the fluid transfer assembly 22 to the fluid-using system 5 by means of positive pressure driving. When performing step 2, the distribution assembly 4 is first used to connect the fluid selection assembly 21 of the working module 2 that needs to transport fluids to the fluid-using system 5. At the same time the power assembly 23 of the working module 2 communicates with the filling liquid storage assembly 33, forming a passage starting from the filling liquid storage assembly 33 and passes through the power assembly 23, the fluid transfer assembly 22, the fluid selection assembly 21, the distribution assembly 4 and the fluid-using system 5 in sequence. Afterwards, the power assembly 23 creates a pressure gradient in the passage, so that the fluid flows out of the fluid transfer assembly 22 and enters the fluid-using system 5 through the fluid selection assembly 21 and the distribution assembly 4 in sequence. While the fluids are transported along the above-mentioned passage, the filling liquid stored in the filling liquid storage assembly 33 enters the fluid transfer assembly 22 through the power assembly 23 to fill the space left by the discharged fluids in the above-mentioned passages.

It should be emphasized that any single working module 2 must perform both step 1 and step 2 in sequence when transporting fluids. If only one working module 2 of the fluid transportation system 1 is transporting fluids, the working module 2 needs to perform step 1 and step 2 in sequence each time. If there are multiple working modules 2 in the fluid transportation system 1 to transport fluids at the same time, the same consideration applies to each module.

First, when each working module 2 performs step 1, only the assemblies in the working module need to be called up to work, so this working module will not be affected and restricted by other working modules 2, regardless of whether other working modules 2 are executing step 1 or step 2.

Second, when any working module 2 performs step 2, it not only needs to call up the assemblies in the working module 2, but also needs to share a passage from the distribution assembly 4 to the fluid-using system 5 with other working modules 2. Therefore, only one working module 2 can perform step 2 at a time, other working modules 2 that need to execute step 1 can continue in execution, while other working modules 2 that need to execute step 2 must wait their turn.

According to the above processes of the working module 2, the working of the fluid transportation system 1 in this embodiment can be optimized according to the number of working modules 2, so as to reduce the total working time. The specific situation is as follows.

Figure 2:
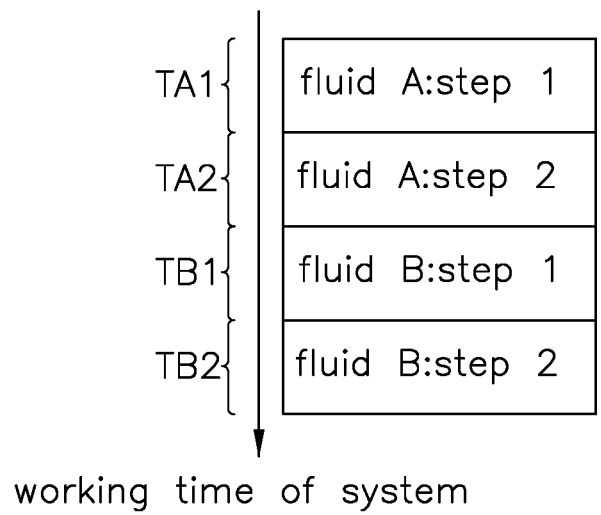
FIGS. 2 to 5 are diagrams showing the system of FIG. 1 at different points in time.

If there is only one working module 2 in the fluid transportation system 1, step 1 is executed first and then step 2 is executed each time fluid is transported. The total time period for sequentially transporting fluid A and fluid B is shown in FIG. 2, wherein TA1 is denoted as a time period for transporting fluid A to perform step 1, and TA2 is denoted as a time period for transporting fluid A to perform step 2. TB1 is denoted as a time period for transporting fluid B to perform step 1, and TB2 is denoted as a time period for transporting fluid B to perform step 2. Therefore, total execution time period (t) is:

$t=TA1+TA2+TB1+TB2.$

If there are only two working modules 2 in the fluid transportation system 1, the working of the fluid transportation system 1 has certain flexibility, and only the following two situations need to be considered.

a): Using a single working module 2, namely the first working module 2a or the second working module 2a' to transport fluid A and fluid B in sequence;

b): using different working modules 2, namely the first working module 2a and the second working module 2a' to transport fluid A and fluid B in sequence.

Figure 3:
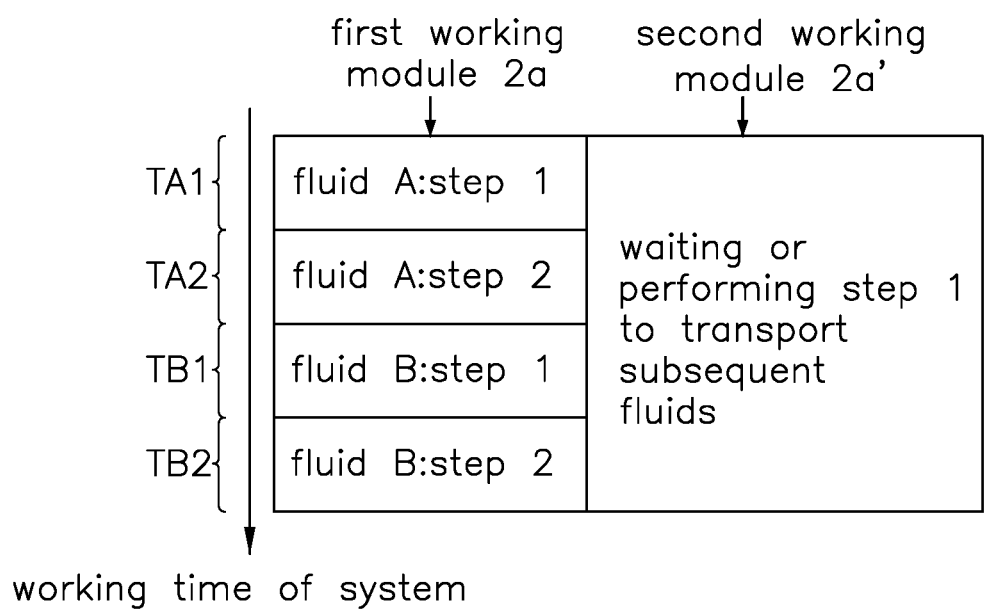

For the case a), the first working module 2a is used to transport the fluid A and the fluid B in turn, while the second working module 2b can wait or can execute step 1 of a subsequent fluid during this process. The total time period for carrying out the sequential transport of fluid A and fluid B is shown in FIG. 3, where TA1 is denoted as a time period of transporting fluid A to perform step 1, and TA2 is denoted as a time period of transporting fluid A to perform step 2. TB1 is denoted as a time period of transporting fluid B to perform step 1, and TB2 is denoted as a time period of transporting fluid B to perform step 2. The t again denotes total execution time period as:

$t=TA1+TA2+TB1+TB2.$

For the case b), the first working module 2a and the second working module 2a' transport fluid A and fluid B in sequence. At this time, step 1 of transporting the fluid A and the fluid B can be performed simultaneously by the first working module 2a and the second working module 2a'.

Figure 4A:
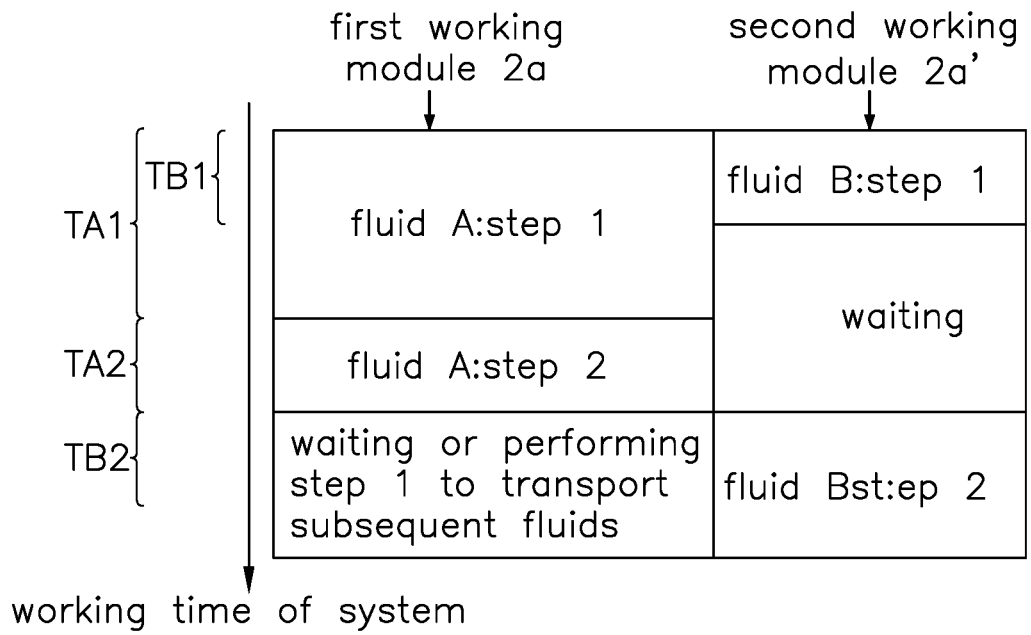
Figure 4B:
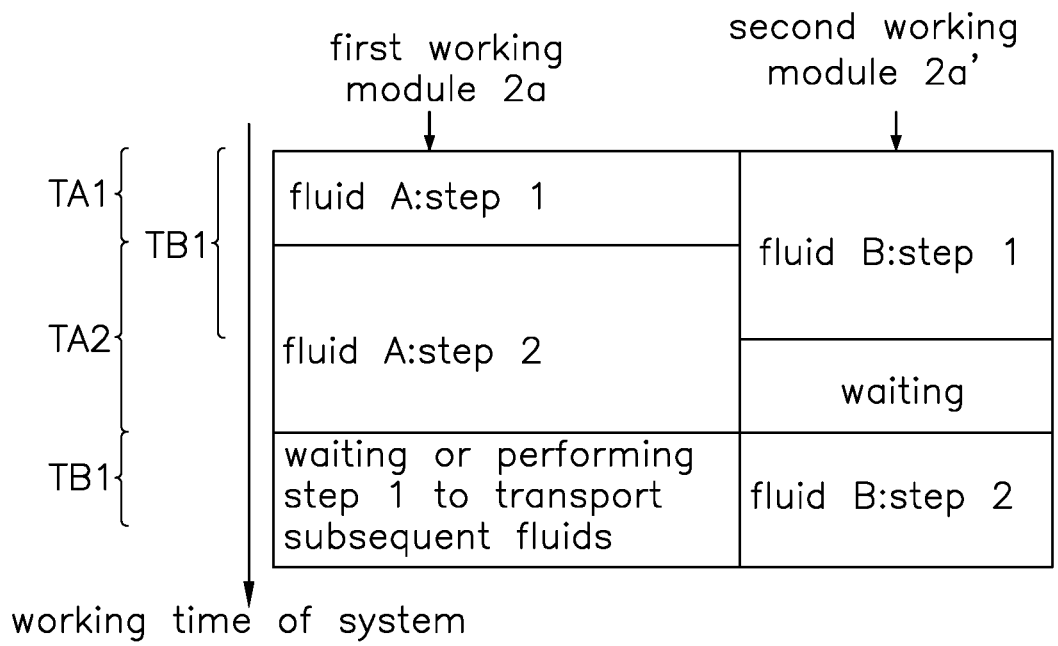

When the total time of performing step 1 and step 2 of transporting fluid A is greater than that of step 1 for transporting fluid B, a total time period for transporting fluid A and fluid B sequentially is shown in FIGS. 4A and 4B, where TA1 is time period for transporting fluid A to perform step 1, and TA2 is time period for transporting fluid A to perform step 2. TB1 is time period for transporting fluid B to perform step 1, and TB2 is time period for transporting fluid B to perform step 2. Therefore, as long as TA1+TA2>TB1 is satisfied, no matter whether TA1>TB1 or TA1<TB1, the total execution time period t is:

$t=TA1+TA2+TB2.$

Figure 5:
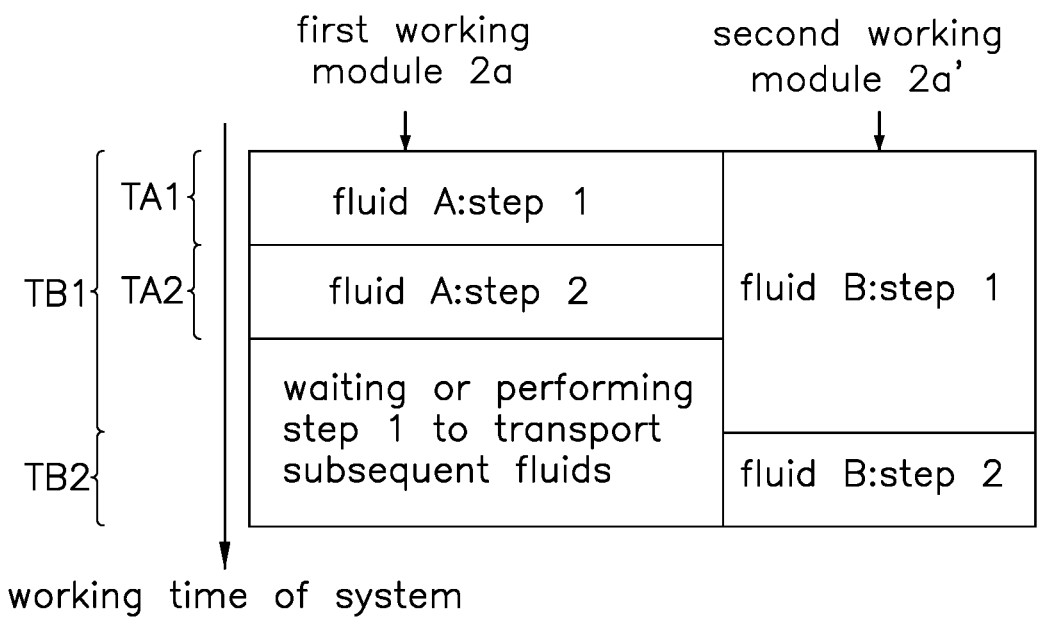

When the total time for performing step 1 and step 2 of transporting fluid A is less than that of step 1 for transporting fluid B, the total time period for transporting fluid A and fluid B is shown in FIG. 5, where TA1 is time period for transporting fluid A to perform step 1, and TA2 is time period for transporting fluid A to perform step 2. TB1 is time period for transporting fluid B to perform step 1, and TB2 is denoted as a time period for transporting fluid B to perform step 2. Therefore, as long as TA1+TA2<TB1 is satisfied, the total execution time period t is:

$t=TB1+TB2.$

It should be noted that, the settings and functions of each working module in the present disclosure are the same, so the working module 2a and the working module 2a' only represent the distinction between the two working modules when carrying out the transportation of different fluids, they do not represent a difference in settings or functions between them.

FIGS. 2 to 5 show that as the number of working modules 2 increases, the total time period to perform the sequential transport of fluid A and fluid B decreases with the optimization of the working processes. As the number of working modules 2 of the fluid transportation system 1 increases, and as the number of types of fluid that can be transported by each working module 2 increases, the total time period performed by the different working modules 2 to transport multiple fluids in sequence is always less than the total time period for sequentially transporting the above fluids performed by a single working module 2, and preferably, different working modules 2 will execute transporting of different kinds of fluids each time.

If the fluid transportation system 1 has more than two working modules 2, and each working module 2 can transport more types of fluids, the greater the flexibility which is obtained when performing continuous transport of more than 2 fluids. The shorter the overall execution time will be, and the theoretical total time period to transport multiple fluids in sequence would be infinitely closer to the sum of the time period for each fluid to perform step 2 only. However, in practical use, not only must flexibility issues be considered, but also various factors such as cross-contamination, fluid amount, etc. must be considered, which will affect the setting of the number of working modules 2 of the fluid transportation system 1, or the choice of each working module 2 to connect different types of fluids. The constraints brought by different design requirements and the different sequential requirements for transporting fluids will result in different optimal working times for the fluid transportation system 1.

Therefore, the working processes of the fluid transportation system 1 can be summarized as follows:

If there is only one working module 2 in the fluid transportation system 1, the working of the fluid transportation system 1 is the working mode of the above-mentioned single working module 2, that is, step 1 is performed first, and then step 2 is performed, each time a fluid is transported;

If there are two or more working modules 2 in the system, the working for multiple fluids can be flexibly arranged by the following processing, so as to minimize the total execution time:

prioritize the use of different working modules 2 to transport different kinds of fluids;

before each work module 2 performs step 2 of transporting each fluid, ensuring that step 1 of transporting the fluid has been completed;

each working module 2 immediately starts to perform step 1 of transporting a next fluid after completing step 2 of transporting the instant fluid.

Compared with the prior art, the fluid transportation system 1 of this embodiment has the following advantages:

1. The working module 2 uses both negative pressure and positive pressure to move fluids. The process of transporting fluids in the working module 2 can be divided into step 1 and step 2, wherein step 1 is driven by a negative pressure to transport fluids from the fluid storage assembly 31 to the fluid transfer assembly 22. Step 1 ensures quantitative accuracy when removing fluids from the fluid storage assembly 31. Step 2 is driven by a positive pressure, which transports fluids from the fluid transfer assembly 22 to the fluid-using system 5. Step 2 achieves faster fluid transportation than negative pressure driving under the same pipe conditions, so that the fluid transportation system 1 has a speed advantage over a fluid transportation system using negative pressure only.

2. Introduce the filling liquid to assist the working module 2 to transport fluids under positive pressure. The filling liquid is used when the working module 2 performs step 2, and infills the pipe space while the positive pressure is transporting fluids. Since such filling liquid is itself a fluid, the compressibility is negligible. Therefore, the working module 2 of the fluid transportation system 1 has higher quantitative accuracy of fluid transportation than the fluid transportation system that uses compressed gas to transport fluids under positive pressure. In addition, the filling liquid can be a relatively safe and low-cost fluid, cleaning fluid or pure water, and can also play the role of flushing the pipeline after the fluid is transported to avoid cross-contamination of two fluids before and after.

3. Setting up multiple working modules 2 can further shorten the total time for transporting fluids. The multiple working modules 2 can change the working processes of fluid transportation from serial logic to parallel logic, making it possible for multiple working modules 2 to work at the same time, thereby optimizing the total time for transporting fluids. For example, when one working module 2 performs step 2, another working module 2 can perform step 1, so that the time of the other working module 2 performing step 1 is omitted from the total time, and the total working time of the fluid transportation system 1 is reduced.

4. Setting up multiple working modules 2 also allows grouping of fluids, to avoid cross-contamination of fluids to the greatest extent. When there are multiple working modules 2 in the fluid transportation system 2, different working modules 2 can flexibly set the supported types of fluids, so that a variety of different fluids can be grouped, and so that each group of fluids only shares the pipes between the distribution assembly 4 and the fluid-using system 5, thereby minimizing the likelihood of fluid cross-contamination.

The fluid transportation system 1 is further described below with specific examples.

Example 1: Fluid Transportation System 1 with One Working Module

Figure 6:
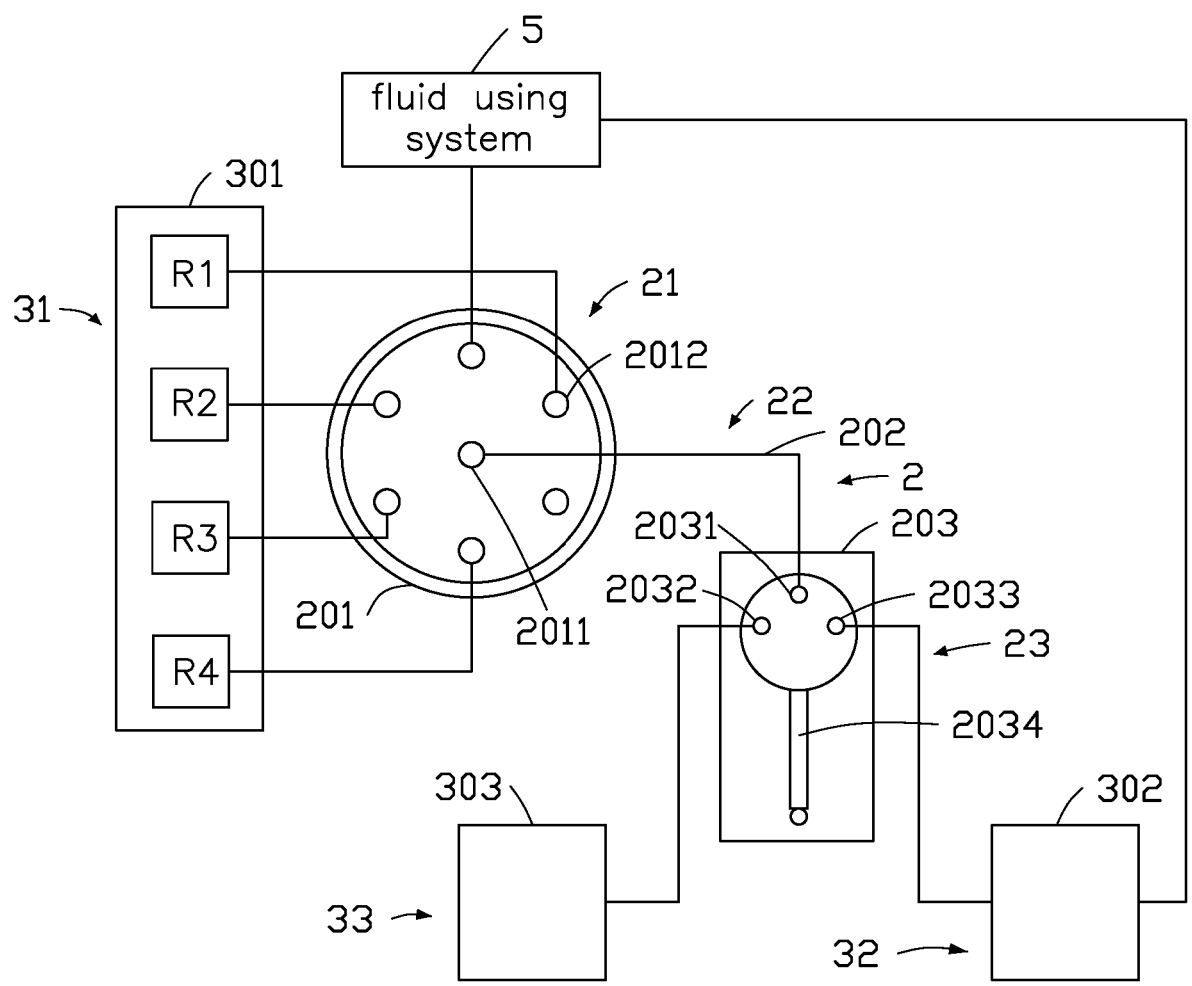
FIG. 6 is Example 1 of the system shown in FIG. 1.

As shown in FIG. 6, the fluid transportation system 1 includes a working module 2 and an auxiliary module 3. The working module 2 includes a fluid selection assembly 21, a fluid transfer assembly 22, and a power assembly 23. The auxiliary module 3 includes a fluid storage assembly 31, a waste storage assembly 32, and a filling liquid storage assembly 33. In this embodiment, the power assembly 23 adopts a syringe pump 203, the fluid selection syringe pump 21 adopts a selection valve 201, the fluid transfer assembly 22 adopts the fluid transfer pipeline 202 between the selection valve 201 and the syringe pump 203, and the fluid storage assembly 31 adopts a fluid warehouse 301. The waste storage assembly 32 adopts a waste bucket 302, and the filling liquid storage assembly 33 adopts a filling liquid bucket 303.

In this embodiment, the power assembly 23 is a syringe pump 203. The syringe pump 203 is provided with at least two distribution interfaces 2031 and 2032, the distribution interface 2031 is connected to the public port 2011 of the selection valve 201 through a pipeline, and the distribution interface 2032 is connected to the filling liquid bucket 303 through at least one pipeline. A distribution interface 2033 can also be configured as required, and one or more pipes are used to connect the waste bucket 302 through the distribution interface 2033. In other embodiments, the distribution interface 2033 and the connected waste bucket 302 can be omitted. Each of the distribution interfaces 2031, 2032 of the syringe pump 203 needs to be able to communicate individually with the syringe 2034 within the syringe pump 203. FIG. 6 shows a syringe pump 203 with three distribution interfaces 2031, 2032, 2033, a syringe pump 203 with more distribution interfaces can be used as needed. These distribution interfaces of the syringe pump 203 can be connected to the public port 2011 of the selection valve 201, to all filling liquid buckets 303 used by the syringe pump 203, and to all waste buckets 302 used by the syringe pump 203 as required.

In this embodiment, the fluid selection assembly 21 is a selection valve 201. The selection valve 201 has a public port 2011 and a plurality of position ports 2012. The public port 2011 of the selection valve 201 is connected to the distribution interface 2031 of the syringe pump 203 through a pipeline, and the pipeline between the selection valve 201 and the syringe pump 203 is the fluid transfer pipeline 202. The position port 2012 of the selection valve 201 is connected to all the containers storing fluids in the fluid warehouse 301 and to the atmosphere through pipes. The position port 2012 that communicates with the atmosphere can be used for backup, or can also be used to intake a certain amount of air from the atmosphere as an isolating gas between fluids. Details of such are in PCT application with application number PCT/CN2017/113797. The selection valve 201 shown in FIG. 6 is a 6-position, 7-port selection valve. The selection valve 201 has six position ports 2012, including four position ports 2012 connected to four fluids in the fluid warehouse 301, one position port 2012 connected to the fluid-using system 5, and one position port 2012 connected to the atmosphere. The selection valve 201 with different numbers of position ports 2012 can be used according to the number of fluid containers. For the case where the number of fluid containers is N, the selection valve 201 needs to have at least N+2 position ports 2012.

In this embodiment, the fluid transfer pipeline 202 between the selection valve 201 and the syringe pump 203 is used as the fluid transfer assembly 22. The fluid transfer pipeline 202 is a section of pipe that can store and pass fluids. One end of the fluid transfer pipeline 202 is connected to the interface 2031 of the syringe pump 203, and the other end is connected to the public port 2011 of the selection valve 201. The inner volume of the fluid transfer pipeline 202 determines the maximum volume of fluid transported by the syringe pump 203 at a single time. FIG. 6 shows a section of fluid transfer pipeline 202. According to the difference between maximum amounts of fluids transported by the syringe pump 203 at a time, in different embodiments, the fluid transfer pipeline 202 with different inner volumes can be selected.

This embodiment uses the fluid warehouse 301 as the fluid storage assembly 31. The fluid warehouse 301 contains a plurality of containers for storing fluids, each container is connected to different position ports 2012 of the selection valve 201 by pipes. FIG. 6 shows a fluid warehouse 301 with four containers R1~R4, each of which is connected to the position port 2012 of the selection valve 201 by a pipe. In other embodiments, fluid warehouse 301 with different numbers of containers may be used, depending on the amount of fluid.

In this embodiment, the filling liquid bucket 303 is used as the filling liquid storage assembly 33. The filling liquid bucket 303 is connected to the distribution interface 2032 of the syringe pump 203 by at least one pipe. FIG. 6 shows the syringe pump 203 using a filling liquid bucket 303.

In this embodiment, the waste bucket 302 is used as the waste storage assembly 32. The waste bucket 302 is connected to the fluid-using system 5 through a pipeline to collect the waste discharged from the fluid-using system 5, and the waste bucket 302 is also connected to the distribution interface 2033 of the syringe pump 203 through one or more pipelines to collect the waste discharged from the syringe pump 203. FIG. 6 shows the situation where the syringe pump 203 and the fluid-using system 5 share a waste bucket 302. Depending on the actual situation, in other embodiments, the syringe pump 203 and the fluid-using system 5 can also use one or more waste buckets 302 separately, or the fluid-using system 5 can use one or more waste buckets 302 alone and the syringe pump 203 does not use the waste bucket 302.

Example 2: Fluid Transportation System 1 with One Working Module

Figure 7:
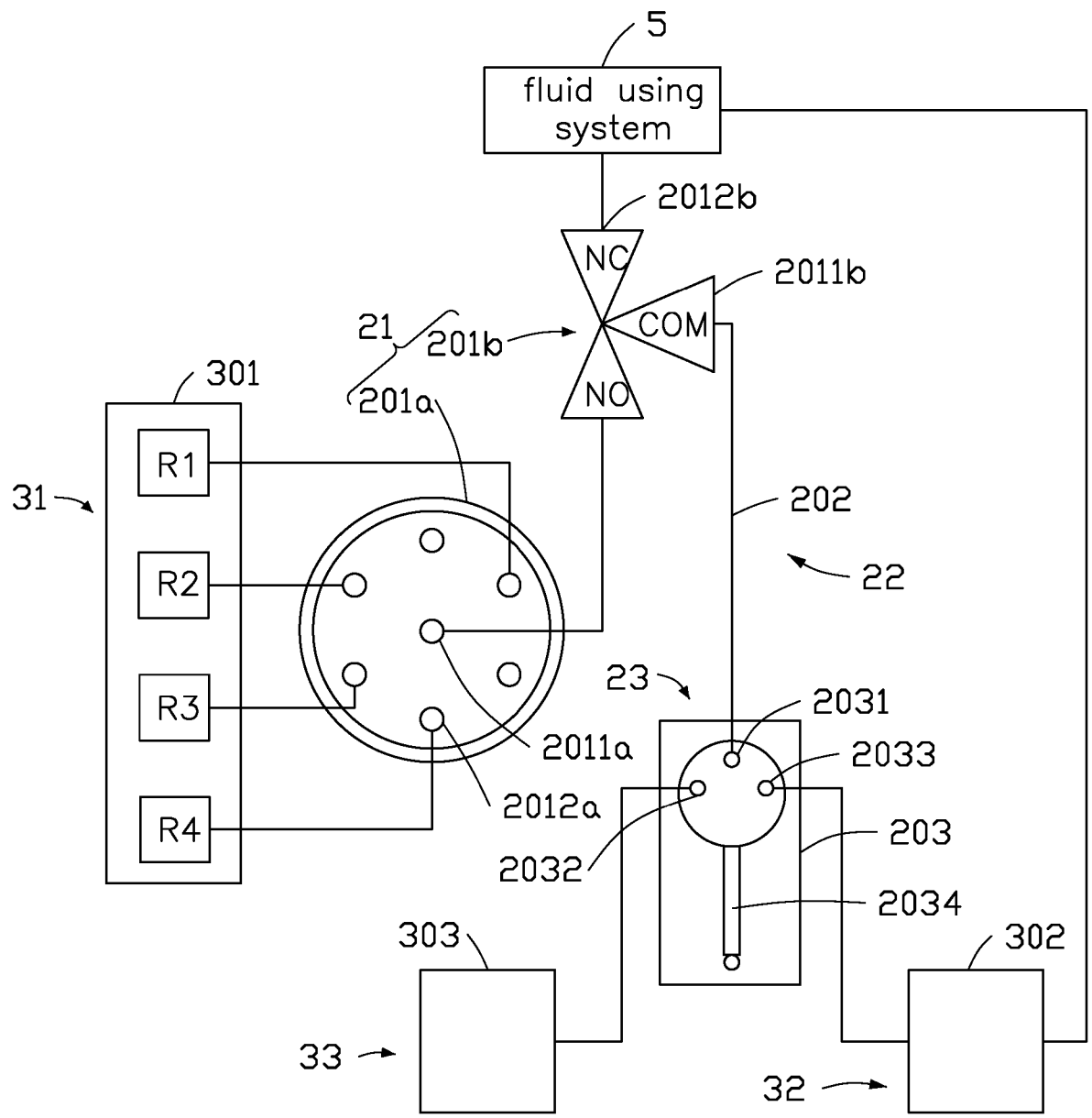
FIG. 7 is Example 2 of the system shown in FIG. 1.

As shown in FIG. 7, in this embodiment, the fluid transportation system 1 includes a working module 2 and an auxiliary module 3. The working module 2 includes a fluid selection assembly 21, a fluid transfer assembly 22 and a power assembly 23. The auxiliary module 3 includes a fluid storage assembly 31, a waste storage assembly 32 and a filling liquid storage assembly 33. In this embodiment, the power assembly 23 is a syringe pump 203, the fluid selection assembly 21 adopts a combination of a selection valve 201a and a solenoid valve 201b, and the fluid transfer assembly 22 adopts the fluid transfer pipeline 202 between the solenoid valve 201b and the syringe pump 203. The fluid storage assembly 31 adopts a fluid warehouse 301, the waste storage assembly 32 adopts a waste bucket 302, and the filling liquid storage assembly 33 adopts a filling liquid bucket 303.

In this embodiment, the syringe pump 203 is used as the power assembly 23. The syringe pump 203 is provided with at least two distribution interfaces 2031 and 2032, the distribution interface 2031 is connected to the public port 2011a of the selection valve 201a through a pipeline, and the distribution interface 2032 is connected to the filling liquid bucket 303 through at least one pipeline. A distribution interface 2033 can also be configured as required, and one or more pipes are used to connect the waste bucket 302 through the distribution interface 2033. In other embodiments, the distribution interface 2033 and the connected waste bucket 302 can also be omitted. Each of the distribution interfaces 2031, 2032 of the syringe pump 203 needs to be able to communicate individually with the syringe 2034 within the syringe pump 203. FIG. 7 shows a syringe pump 203 with three distribution ports 2031, 2032, 2033, a syringe pump 203 with more distribution ports can be used as needed. These distribution ports of the syringe pump 203 can be connected to the public port 2011a of the selection valve 201a, to all filling liquid buckets 303 used by the syringe pump 203, and to all waste buckets 302 used by the syringe pump 203 as required.

In this embodiment, the solenoid valve 201b is used in conjunction with the selection valve 201a as the fluid selection assembly 21. The solenoid valve 201b has one public port 2011b and two position ports 2012b. The public port 2011b of the solenoid valve 201b is connected to the distribution interface 2031 of the syringe pump 203 through a pipeline, and the pipeline between the solenoid valve 201b and the syringe pump 203 is the fluid transfer pipeline 202. The position port 2012b of the solenoid valve 201b is connected to the public port 2011a of the selection valve 201a and the fluid-using system 5 through pipes. The selection valve 201a has one public port 2011a and a plurality of position ports 2012a. The public port 2011a of the selection valve 201a is connected to the position port 2012b of the solenoid valve 201b through pipes; the position port 2012b of the selection valve 201a is respectively connected to all the containers storing fluids in the fluid warehouse 301 through pipes, and to the atmosphere. The position port 2012 that communicates with the atmosphere can be used for backup, or can also be used to intake a certain amount of air from the atmosphere as an isolating gas between fluids. PCT application with application number PCT/CN2017/113797 illustrates this. The solenoid valve 201b shown in FIG. 7 is a 2-position 3-port solenoid valve, and the selection valve 201a is a 6-position, 7-port selector valve. The solenoid valve 201b has two position ports 2012b, one position port 2012b is a normally-open port and the other position port 2012b is a normally-closed port, respectively connected to the public port 2011a of the selection valve 201a and the fluid-using system 5. The selection valve 201a has six position ports 2012a, including four position ports 2012a connected to four fluids in the fluid warehouse 301, and two position ports 2012a connected to the atmosphere. In other embodiments, the selection valve 201a with different numbers of position ports 2012a can be used according to the number of fluid containers. For the case where the number of fluid containers is N, the selection valve 201a needs to have at least N+1 position ports 2012a.

In this embodiment, the fluid transfer pipeline 202 between the public port 2011b of the solenoid valve 201b and the syringe pump 203 is used as the fluid transfer assembly 22. The fluid transfer pipeline 202 is a section of pipe that can both transport and store fluids. One end of the fluid transfer pipeline 202 is connected to the distribution interface 2031 of the syringe pump 203, and the other end is connected to the public port 2011b of the solenoid valve 201b. The inner volume of the fluid transfer pipeline 202 determines the maximum volume of fluid transported by the syringe pump 203 at one single time, and the inner volume of the syringe 2034 of the syringe pump 203 needs to be larger than the inner volume of the fluid transfer pipeline 202. FIG. 7 shows a section of fluid transfer pipeline 202. According to the difference of the maximum amount of fluid transported by the syringe pump 203 at one time, in different embodiments, the fluid transfer pipeline 202 with different inner volume can be selected.

This embodiment uses the fluid warehouse 301 as the fluid storage assembly 31. The fluid warehouse 301 contains a plurality of containers for storing fluids, each container is connected to different position ports 2012a of the selection valve 201a by pipes. FIG. 7 shows a fluid warehouse 301 with four containers R1~R4, each of which is connected to the position port 2012a of the selection valve 201a by a pipe. In other embodiments, fluid warehouse 301 with different numbers of containers may be used, depending on the amount of fluid.

In this embodiment, the filling liquid bucket 303 is used as the filling liquid storage assembly 33. The filling liquid bucket 303 is connected to the distribution interface 2032 of the syringe pump 203 by at least one pipe. FIG. 7 shows the situation where the syringe pump 203 uses one filling liquid bucket 303.

In this embodiment, the waste bucket 302 is used as the waste storage assembly 32. The waste bucket 302 is connected to the fluid-using system 5 through a pipeline to collect the waste discharged from the fluid-using system 5, and the waste bucket 302 is also connected to the distribution interface 2033 of the syringe pump 203 through one or more pipelines to collect the waste discharged from the syringe pump 203. FIG. 7 shows the situation where the syringe pump 203 and the fluid-using system 5 share a waste bucket 302. Depending on the actual situation, in other embodiments, the syringe pump 203 and the fluid-using system 5 can also use one or more waste buckets 302 separately, or the fluid-using system 5 can by itself use one or more waste buckets 302, and the syringe pump 203 does not use the waste bucket 302.

Example 3: Fluid Transportation System 1 with One Working Module

Figure 8:
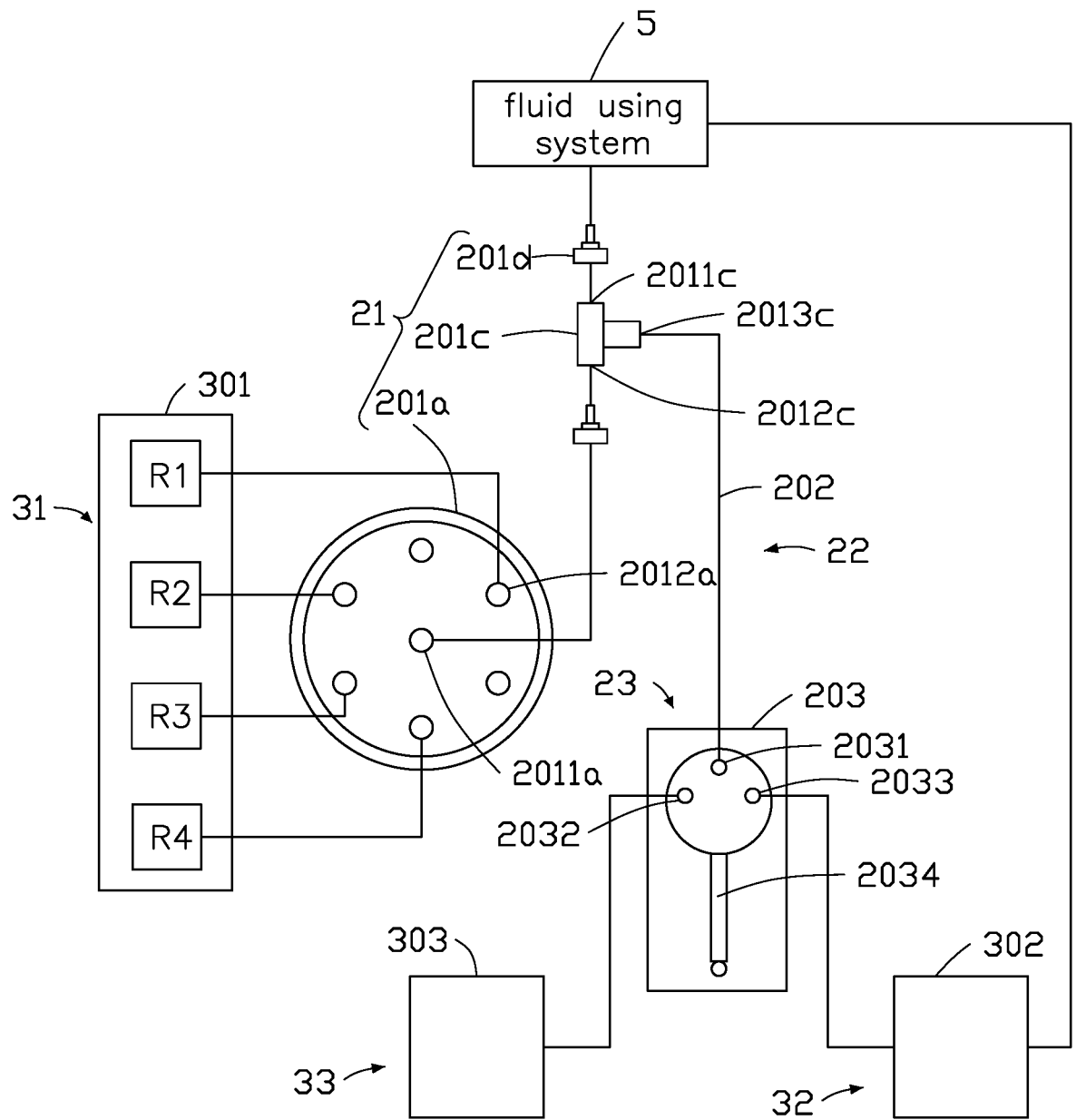
FIG. 8 is Example 3 of the system shown in FIG. 1.

As shown in FIG. 8, in this embodiment, the fluid transportation system 1 includes a working module 2 and an auxiliary module 3. The working module 2 includes a fluid selection assembly 21, a fluid transfer assembly 22 and a power assembly 23, and the auxiliary module 3 includes a fluid storage assembly 31, a waste storage assembly 32 and a filling liquid storage assembly 33. In this embodiment, the power assembly 23 is a syringe pump 203, the fluid selection assembly 21 adopts a combination of a selection valve 201a, a Tee joint 201c, and a one-way valve (or a check valve) 201d. The fluid transfer assembly 22 adopts the fluid transfer pipeline 202 between the Tee joint 201c and the syringe pump 203, the fluid storage assembly 31 adopts the fluid warehouse 301, and the filling liquid storage assembly 33 adopts the filling liquid bucket 303.

In this embodiment, the syringe pump 203 is used as the power assembly 23. The syringe pump 203 is provided with at least two distribution interfaces 2031 and 2032, the distribution interface 2031 is connected to the public port 2011a of the selection valve 201a through a pipeline, and the distribution interface 2032 is connected to the filling liquid bucket 303 through at least one pipeline. A distribution interface 2033 can also be configured as required, and one or more pipes are used to connect the waste bucket 302 through the distribution interface 2033. In other embodiments, the distribution interface 2033 and the connected waste bucket 302 can be omitted. Each of the distribution interfaces 2031, 2032 of the syringe pump 203 needs to be able to communicate individually with the syringe 2034 within the syringe pump 203. FIG. 8 shows a syringe pump 203 with three distribution ports 2031, 2032, 2033, a syringe pump 203 with more distribution ports can be used as needed. These distribution ports of the syringe pump 203 can be connected to the public port 2011a of the selection valve 201a, all filling liquid buckets 303 used by the syringe pump 203, and all waste buckets 302 used by the syringe pump 203 as required.

In this embodiment, a Tee joint 201c and a one-way valve 201d are used to cooperate with a selection valve 201a as the fluid selection assembly 21. The Tee joint 201c has three interfaces 2011c, 2012c, and 2013c. 2011c is connected to fluid-using system 5 through a one-way valve 201d which allows passage in the direction from the Tee joint 201c to the fluid-using system 5. The interface 2012c is connected to the public port 2011a of the selection valve 201a through a one-way valve 201d, the one-way valve 201d allows the passage of the direction from the public port 2011a of the selection valve 201a to the Tee joint 201c. The interface 2013c is connected to the interface 2031 of the syringe pump 203 through a pipeline, and the pipeline between the Tee joint 201c and the syringe pump 203 is the fluid transfer pipeline 202. The selection valve 201a has one public port 2011a and a plurality of position ports 2012a. The public port 2011a of the selection valve 201a is connected to the inlet of a one-way valve 201d through a pipeline. The position port 2012a of the selection valve 201a is connected to all containers storing fluids in the fluid warehouse 301 through pipelines, and to the atmosphere. The position port 2012 that communicates with the atmosphere can be used for backup, or can also be used to intake a certain amount of air from the atmosphere as an isolating gas between fluids. PCT application with application number PCT/CN2017/113797 illustrates this. FIG. 8 shows that one Tee joint 201c and two one-way valves 201d cooperate with one selection valve 201a as the fluid selection assembly 21. The selection valve 201a has six position ports 2012a, including four position ports 2012a connected to four fluids in the fluid warehouse 301, and two position ports 2012a connected to the atmosphere. In other embodiments, the selection valve 201a with different numbers of position ports 2012a can be used according to the number of fluid containers. For the case where the number of fluid containers is N, the selection valve 201a needs to have at least N+1 position ports 2012a.

In this embodiment, the fluid transfer pipeline 202 between the Tee joint 201c and the syringe pump 203 is used as the fluid transfer assembly 22. The fluid transfer pipeline 202 is a section of pipe that can store and pass fluids. One end of the fluid transfer pipeline 202 is connected to the distribution interface 2031 of the syringe pump 203, and the other end is connected to one interface 2013c of the Tee joint 201c. The inner volume of the fluid transfer pipeline 202 determines the maximum volume of fluids transported by the syringe pump 203 at a single time, and the inner volume of the syringe 2034 of the syringe pump 203 needs to be larger than the inner volume of the fluid transfer pipeline 202. FIG. 8 shows a section of fluid transfer pipeline 202. According to differences of maximum amount of fluid transported by the syringe pump 203 at one time, in different embodiments, the fluid transfer pipeline 202 with different inner volume can be selected.

This embodiment uses the fluid warehouse 301 as the fluid storage assembly 31. The fluid warehouse 301 contains a plurality of containers for storing fluids, each container is connected to different position ports 2012a of the selection valve 201a by pipes. FIG. 8 shows a fluid warehouse 301 with four containers R1~R4, each of which is connected to the position port 2012a of the selection valve 201a by a pipe. In other embodiments, fluid warehouse 301 with different numbers of containers may be used, depending on the amount of fluid.

In this embodiment, the filling liquid bucket 303 is used as the filling liquid storage assembly 33. The filling liquid bucket 303 is connected to the distribution interface 2032 of the syringe pump 203 by at least one pipe. FIG. 8 shows the situation where the syringe pump 203 uses one filling liquid bucket 303.

In this embodiment, the waste bucket 302 is used as the waste storage assembly 32. The waste bucket 302 is connected to the fluid-using system 5 through a pipeline to collect the waste discharged from the fluid-using system 5, and the waste bucket 302 is also connected to the distribution interface 2033 of the syringe pump 203 through one or more pipelines to collect the waste discharged from the syringe pump 203. FIG. 8 shows the situation where the syringe pump 203 and the fluid-using system 5 share one waste bucket 302. Depending on the actual situation, in other embodiments, the syringe pump 203 and the fluid-using system 5 can also use one or more waste buckets 302 separately, or the fluid-using system 5 can use one or more waste buckets 302 alone and the syringe pump 203 will not use the waste bucket 302.

Example 4: Fluid Transportation System 1 with Two Working Modules

Figure 9:
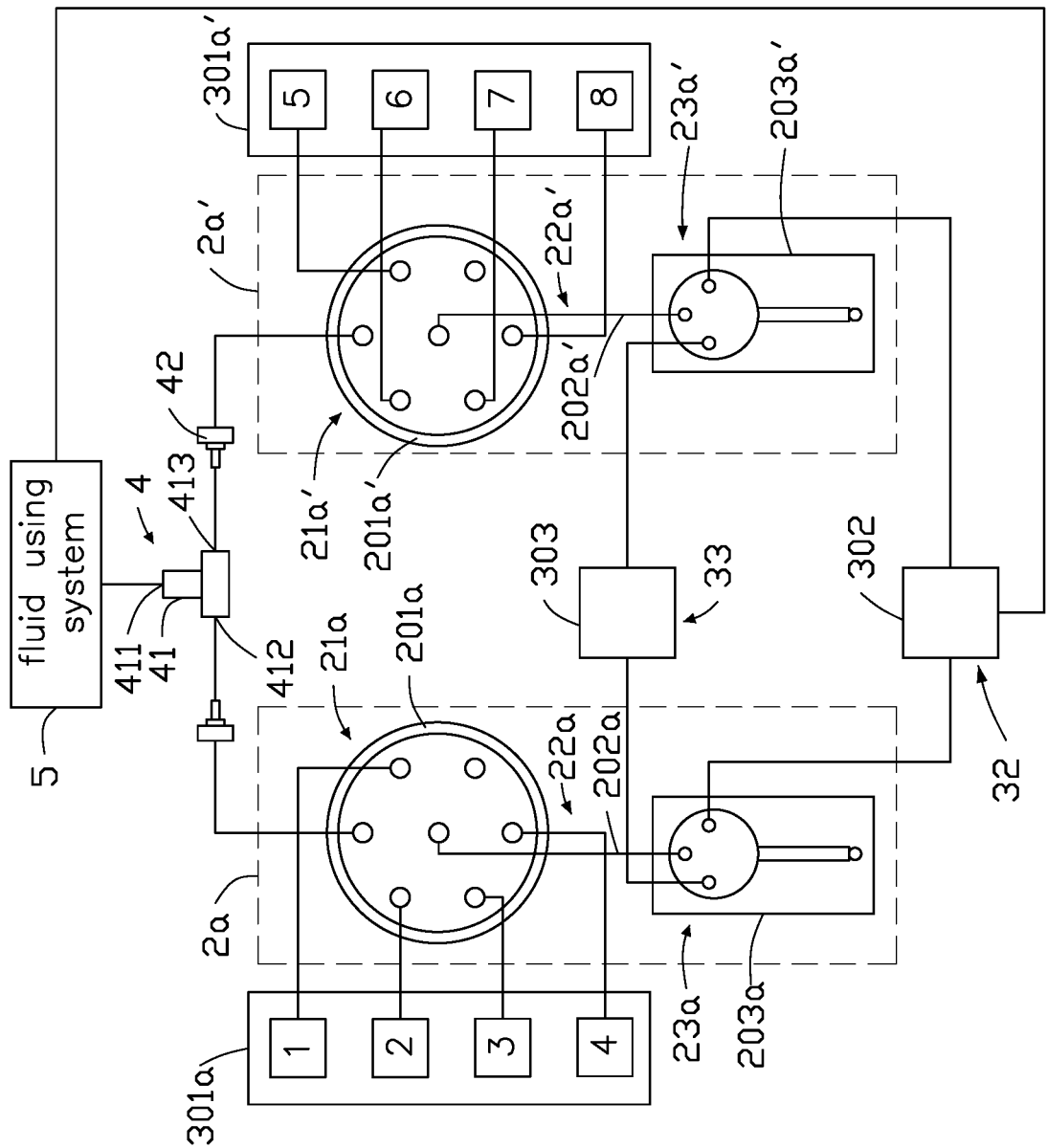
FIG. 9 is Example 4 of the system shown in FIG. 1.

As shown in FIG. 9, in this embodiment, the fluid transportation system 1 includes two working modules 2, an auxiliary module 3, and a distribution assembly 4. Each working module 2 includes a fluid selection assembly, a fluid transfer assembly, and a power assembly. The auxiliary module 3 includes a fluid storage assembly 31, a waste storage assembly 32, and a filling liquid storage assembly 33. In this embodiment, the power assembly adopts a syringe pump, the fluid selection assembly adopts a selection valve, and the fluid transfer assembly adopts a fluid transfer pipeline between the selection valve and the syringe pump. The fluid storage assembly 31 adopts a fluid warehouse. In this embodiment, the fluid warehouse includes fluid warehouse 301a and fluid warehouse 301a', the waste storage assembly 32 adopts the waste bucket 302, the filling liquid storage assembly 33 adopts the filling liquid bucket 303, and the distribution assembly 4 adopts the combination of the Tee joint 41 and the one-way valve 42.

In this embodiment, for the convenience of description, the two working modules 2 are designated the first working module 2a and the second working module 2a'. The power assembly of the first working module 2a is called the first power assembly 23a, the fluid selection assembly of the first working module 2a is called the first fluid selection assembly 21a, and the fluid transfer assembly of the first working module 2a is called the first fluid transfer assembly 22a. The syringe pump of the first working module 2a is called the first syringe pump 203a, the selection valve of the first working module 2a is called the first selection valve 201a, and the fluid transfer pipeline of the first working module 2a is called the first fluid transfer pipeline 202a. The power assembly of the second working module 2a' is called the second power assembly 23a', the fluid selection assembly of the second working module 2a' is called the second fluid selection assembly 21a', and the fluid transfer assembly of the second working module 2a' is called the second fluid transfer assembly 22a'. The syringe pump of the second working module 2a' is called the second syringe pump 203a', the selection valve of the second working module 2a' is called the second selection valve 201a', and the fluid transfer pipeline of the second working module 2a' is called the second fluid transfer pipeline 202a'.

In this embodiment, the first working module 2a is connected to the fluid warehouse 301a, the second working module 2a' is connected to the fluid warehouse 301a', and the first working module 2a and the second working module 2a' share the filling liquid bucket 303 and the waste bucket 302. Both the first working module 2a and the second working module 2a' are connected to the fluid-using system 5 through the distribution assembly 4. The connection and operation mode between the first working module 2a with the fluid warehouse 301a, the filling liquid bucket 303, and the waste bucket 302 are the same as those previously described, and the connection and operation mode between the second working module 2a' with the fluid warehouse 301a', the filling liquid bucket 303, and the waste bucket 302 are the same as those previously described. The relevant descriptions are not repeated here, only differences are described.

In this embodiment, the filling liquid bucket 303 is connected to the interfaces of the first syringe pump 203a and the second syringe pump 203a' through at least one pipeline. In other embodiments, according to the actual situation, each of the first syringe pump 203a and the second syringe pump 203a' can also use one or more filling liquid buckets 303 independently.

In this embodiment, the waste bucket 302 is connected to the fluid-using system 5 through a pipeline to collect waste discharged from the fluid-using system 5, and is also connected to the interface of the first syringe pump 203a and the second syringe pump 203a' through one or more pipelines respectively to collect the waste discharged by the first syringe pump 203a and the second syringe pump 203a'. In this embodiment, the fluid-using system 5 shares a waste bucket 302 with the first syringe pump 203a and the second syringe pump 203a'. In other embodiments, depending on the actual situation, one or more waste buckets 302 may be used by the fluid-using system 5 alone, while the first syringe pump 203a and the second syringe pump 203a' do not use the waste buckets 302, or the fluid-using system 5. Each of the first syringe pump 203a and the second syringe pump 203a' use one or more waste buckets 302.

In this embodiment, a three-way structure composed of a Tee joint 41 and a one-way valve 42 is used as the distribution assembly 4. The Tee joint 41 has three interfaces 411, 412, and 413, wherein the interface 411 is connected to the fluid-using system 5 through a pipeline, and the interfaces 412 and 413 are respectively connected to the public port of the first selection valve 201a or the second selector valve 201a through a one-way valve 42. The direction allowed by each one-way valve 42 is from the public port of the corresponding first selection valve 201a or the second selection valve 201a' to the Tee joint 41. FIG. 9 shows the connection of two one-way valves 42 and one Tee joint 41. In other embodiments, depending on the actual situation, a 2-position, 3-way solenoid valve can also be used to replace the three-way structure. The solenoid valve has one public port and two position ports, wherein the public port is connected to the fluid-using system 5 through a pipeline, and the two position ports are connected to the public ports of the first selection valve 201a and the second selection valve 201a'.

Example 5: Fluid Transportation System 1 with Six Working Modules

Figure 10:
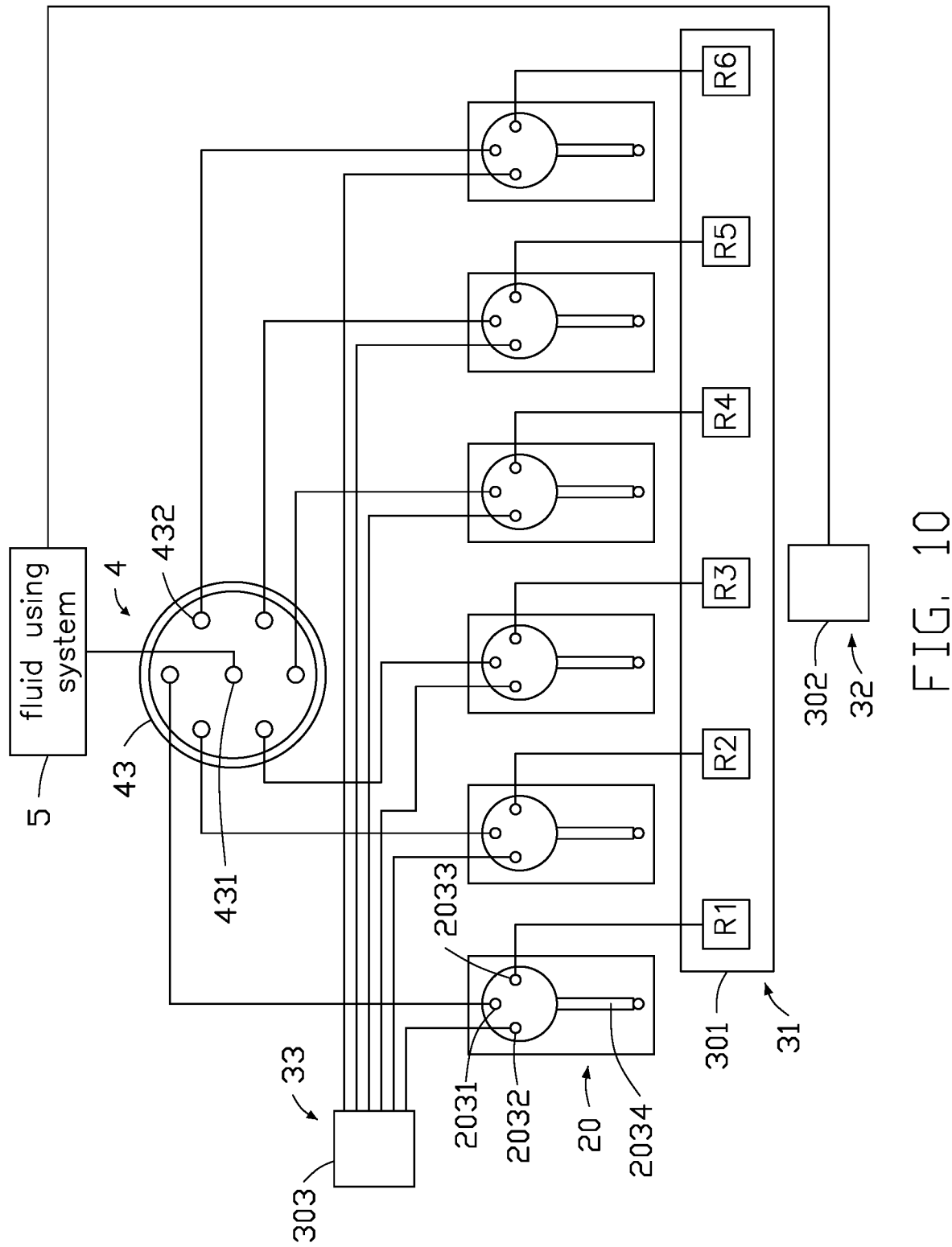
FIG. 10 is Example 5 of the system shown in FIG. 1.

As shown in FIG. 10, in this embodiment, the fluid transportation system 1 includes six working modules 2, an auxiliary module 3, and a distribution assembly 4. Each working module 2 includes a fluid selection assembly, a fluid transfer assembly, and a power assembly. The auxiliary module 3 includes a fluid storage assembly 31, a waste storage assembly 32, and a filling fluid storage assembly 33. The fluid storage assembly 31 adopts a fluid warehouse 301, which includes six containers R1~R6; the waste storage assembly 32 adopts a waste bucket 302, and the filling liquid storage assembly 33 adopts a filling liquid bucket 303. The distribution assembly 4 adopts a selection valve 43. Each working module 2 uses the syringe pump 20 as the power assembly, and the fluid transfer assembly and the fluid distribution assembly are used at the same time. Specifically, the syringe pump 20 itself serves as the power assembly, the syringe 2034 of the syringe pump 20 serves as the fluid transfer assembly, and the valve head of the syringe pump 20 is used as a fluid distribution assembly. Therefore, only one syringe pump 20 is needed to realize the function of a complete working module 2. The syringe pump 20 is provided with at least three distribution interfaces 2031, 2032 and 2033. The interface 2031 is connected to the position port 432 of the selection valve 43 through a pipeline, the interface 2032 is connected to the filling liquid bucket 303 through at least one pipeline, and the interface 2033 is connected to one of the fluid storage containers R1 to R6 of the fluid warehouse 301 through at least one pipeline. In this embodiment, the syringe pump 20 is not connected to the waste bucket 302, however, in other embodiments, the syringe pump 20 can also be provided with an interface (not shown) connected to the waste bucket 302. The syringe 2034 in the syringe pump 20 serves as a fluid transfer assembly, and the inner volume of the syringe 2034 determines the maximum volume of fluid delivered by the syringe pump 20 at a single time. FIG. 10 shows six syringe pumps with three distribution interfaces 2031, 2032 and 2033. In other embodiments, as needed, syringe pumps 20 with more distribution interfaces may be used. The syringe pump 20 is connected to the position port of the selection valve 43, to all the filling liquid buckets 303 used by the syringe pump 20, to one of the containers R1 to R6 of the fluid warehouse 301 used by the pump 20, and to all the waste buckets 302 used by the syringe pump 20 through such interfaces.

In this embodiment, the fluid warehouse 301 is used as the fluid storage assembly 31. The fluid warehouse 301 includes a plurality of containers for storing fluids, each container is connected to the distribution interface 2033 of the syringe pump 20 through a pipeline, wherein any container can be connected to different distribution interfaces 2033 of the same syringe pump 20, or can be connected to distribution interfaces 2033 of different syringe pumps 20. FIG. 10 shows a fluid warehouse 301 having six containers R1 to R6, each of which is connected to a distribution interface 2033 of a syringe pump 20 via pipes. In other embodiments, the fluid warehouse 301 with different numbers of storage containers may be used according to the amount of fluid, and each fluid warehouse 301 may have a different number of containers for storing fluids.

In this embodiment, the filling liquid bucket 303 is used as the filling liquid storage assembly 33. The filling liquid bucket 303 is connected to the distribution interfaces 2032 of each syringe pump 20 through at least one pipeline. FIG. 10 shows the case where six syringe pumps 20 share one filling liquid bucket 303. In other embodiments, according to the actual situation, each syringe pump 20 can also use one or more filling liquid buckets 303 independently.

In this embodiment, the waste bucket 302 is used as the waste storage assembly 32. The waste bucket 302 is connected to the fluid-using system 5 through a pipeline to collect the waste liquid discharged from the fluid-using system 5. In addition, in other embodiments, the waste bucket 302 can also be connected to the distribution interfaces of each syringe pump 20 through one or more pipelines to collect the waste liquid discharged from each syringe pump 20. FIG. 10 shows a situation where the fluid-using system 5 uses one waste bucket 302 but none of the syringe pumps 20 uses the waste bucket 302.

In other embodiments, depending on the actual situation, the fluid-using system 5 and all the syringe pumps 20 may share one waste bucket 302, or can use one or more waste buckets 302 separately.

In this embodiment, the selection valve 43 is used as the distribution assembly 4. The selection valve 43 has one public port 431 and a plurality of position ports 432. The public port 431 of the selection valve 43 is connected to the fluid-using system 5 by a pipe. The position port 432 of the selection valve 43 is connected to the distribution interface 2031 of each syringe pump 20 through pipes. As shown in FIG. 10, in this embodiment, the selection valve 43 is a 6-position, 7-port selection valve. The selection valve 43 has six position ports 432, each of which is connected to a distribution interface 2031 of a syringe pump 20. In other embodiments, depending on the number of syringe pumps 20, the selection valve 43 with different numbers of position ports 432 can be used. For the case where the number of syringe pumps 20 is N, the number of the position ports of the selection valve 43 is at least N.

Figure 11:
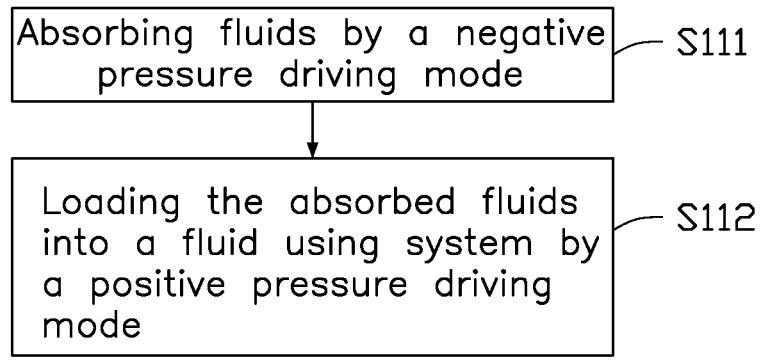
FIG. 11 is a flowchart of the fluid transportation method according to Embodiment II of the present disclosure.

Referring to FIG. 11, the present disclosure further provides a fluid transportation method including steps S111 and S112. Under Step S111, fluids are moved by a negative pressure driving mode and under Step S112 fluids are moved into and within the fluid-using system by a positive pressure driving mode.

Wherein, step S111 may further include: establishing connection among a power assembly, a fluid transfer assembly, and a fluid storage assembly, running the power assembly to absorb fluids from the fluid storage assembly and temporarily store the fluids in the fluid transfer assembly, and blocking the connection between the power assembly, the fluid transfer assembly, and the fluid storage assembly.

Wherein, step S112 may further include: establishing connection among the power assembly, the fluid transfer assembly, and the fluid-using system, and running the power assembly to load fluids temporarily stored in the fluid transfer assembly into the fluid-using system.

Wherein, step S111 may further include: step a) establishing connection between a first working module and a fluid storage assembly, running the first working module to absorb fluids from the fluid storage assembly, and blocking the connection between the first working module and the fluid storage assembly after completion; and step b) establishing connection between a second working module and the fluid storage assembly, running the second working module to absorb fluids from the fluid storage assembly, and blocking the connection between the second working module and the fluid storage assembly after completion. Wherein, the step a) and the step b) can be performed in parallel.

Wherein, step S112 may further include: establishing connection between the first working module and a fluid-using system, and running the first working module to load absorbed fluids into the fluid-using system; and step d) establishing connection between the second working module and the fluid-using system, and running the second working module to load the absorbed fluids into the fluid-using system.

Wherein, the execution of the step b) at least partially overlaps the execution of the step a) along a time axis, and/or, the execution of the step b) at least partially overlaps the execution of the step c) along the time axis.

Wherein, a total time period required for performing the steps a), b), c), and d) is denoted as T, a time period required for performing the step a) is denoted as TA1, a time period required for performing the step b) is denoted as TB1. Time period required for performing the step c) is denoted as TA2, and a time period required for performing the step d) is denoted as TB2, wherein T<TA1+TA2+TB1+TB2.

Figure 12:
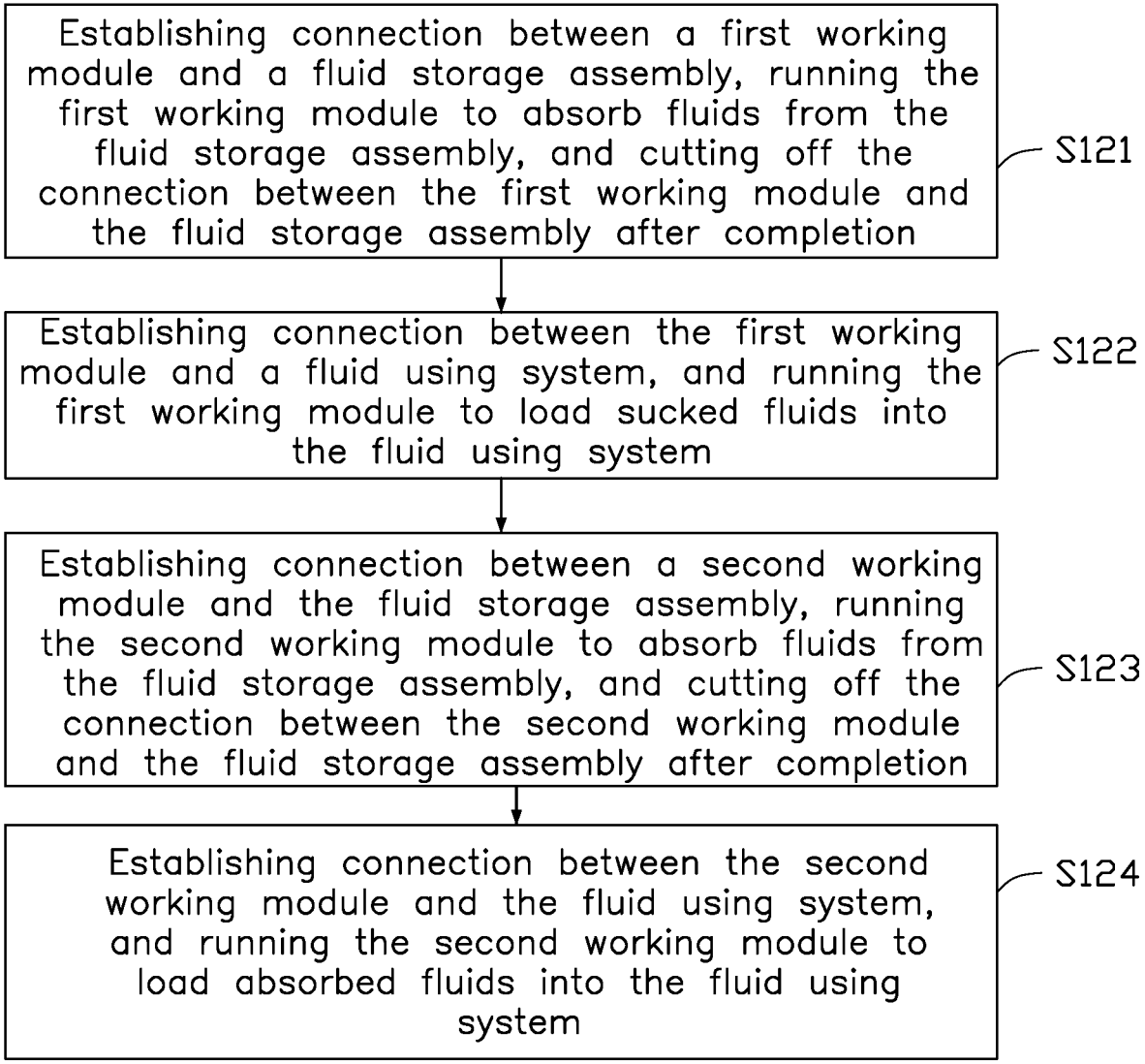
FIG. 12 is a flowchart of the fluid transport method according to Embodiment III of the present disclosure.

Referring to FIG. 12, the present disclosure further provides a fluid transportation method. The execution order of some steps of the method can be changed, and some steps can be executed in parallel. The fluid transportation method includes:

Step S121, establishing connection between a first working module and a fluid storage assembly, running the first working module to absorb fluids from the fluid storage assembly, and blocking the connection between the first working module and the fluid storage assembly after completion;

Step S122, establishing connection between the first working module and a fluid-using system, and running the first working module to load absorbed fluids into the fluid-using system;

Step S123, establishing connection between a second working module and the fluid storage assembly, running the second working module to absorb fluids from the fluid storage assembly, and blocking the connection between the second working module and the fluid storage assembly after completion;

Step S124, establishing connection between the second working module and the fluid-using system, and running the second working module to load absorbed fluids into the fluid using-system.

Wherein, the total time for the first working module and the second working module to transfer fluids from the fluid storage assembly to the fluid-using system is less than the sum of the time spent by the first working module and the second working module respectively in transferring fluids from the fluid storage assembly to the fluid-using system.

Wherein, the execution of step S121 and step S122 do not overlap with each other along the time axis, and the execution of step S123 and step S124 do not overlap with each other along the time axis. The execution of step S122 and step S124 do not overlap with each other along the time axis, and the execution of step S123 and step S121 at least partially overlap with each other along the time axis, and/or, the execution of steps S123 and S122 at least partially overlap with each other along the time axis. Wherein, the time axis represents a running of time. The sequence of occurrence of events and the overlapping period of occurrence of events can be defined through the time axis.

Wherein, in step S121, the first working module absorbs fluids from the fluid storage assembly by means of negative pressure driving, and/or, in step S123, the second working module absorbs fluids from the fluid storage assembly by means of negative pressure driving.

Wherein, in step S122, the first working module loads the fluids into the fluid-using system by means of positive pressure driving, and/or, in step S124, the second working module loads the fluid into the fluid-using system by means of positive pressure driving.

Wherein, step S121 specifically includes: establishing connection between the power assembly, the fluid transfer assembly of the first working module and the fluid storage assembly, running the power assembly to absorb fluids from the fluid storage assembly and temporarily storing in the fluid transfer assembly, and cutting off the connection between the power assembly, the fluid transfer assembly, and the fluid storage assembly after completion. And/or step S123 specifically includes: establishing connection between the power assembly, the fluid transfer assembly of the second working module and the fluid storage assembly, running the power assembly to absorb fluids from the fluid storage assembly and temporarily storing in the fluid transfer assembly, and cutting off the connection between the power assembly, the fluid transfer assembly and the fluid storage assembly after completion.

Wherein, step S122 specifically includes: establishing connection between the power assembly, the fluid transfer assembly of the first working module and the fluid using assembly, and running the power assembly of the first working module to load absorbed fluids into the fluid using assembly. Step S124 specifically includes: establishing connection between the power assembly, the fluid transfer assembly of the second working module and the fluid-using system, and running the power assembly of the second working module to load absorbed fluids into the fluid using assembly.

Figure 13:
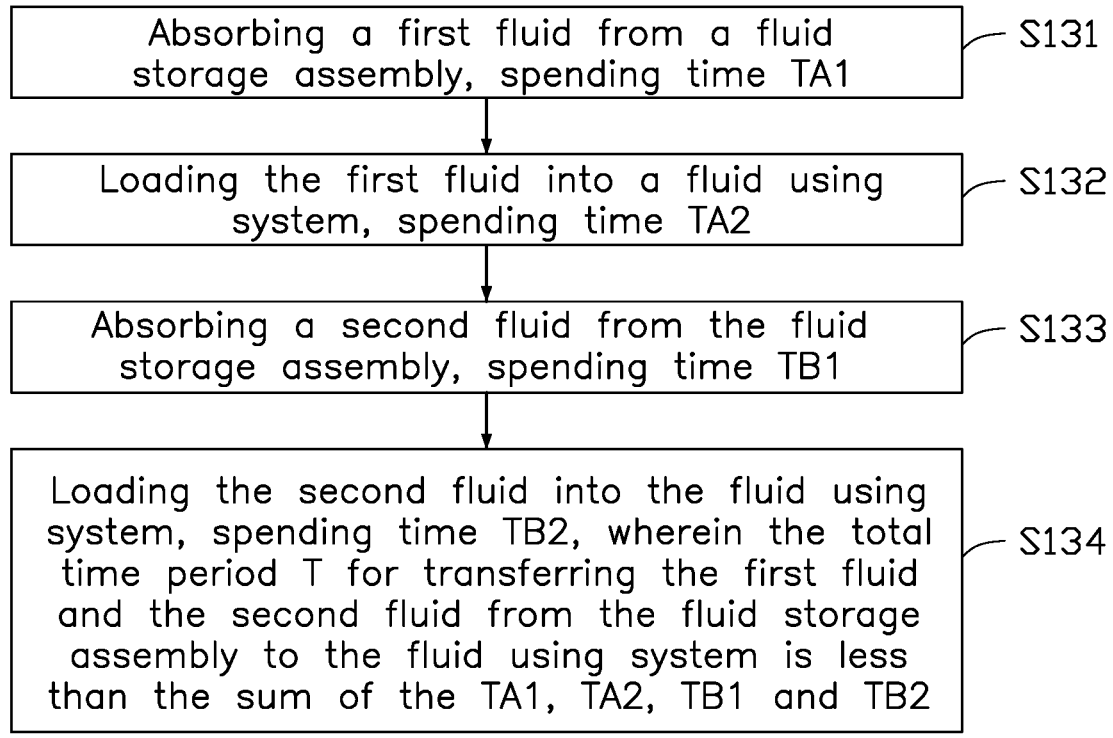
FIG. 13 is a flowchart of the fluid transportation method according to Embodiment IV of the present disclosure.

Referring to FIG. 13, the present disclosure further provides a fluid transportation method. The execution order of some steps of the method can be changed, and some steps can be executed in parallel. The fluid transportation method includes:

step S131, absorbing a first fluid from a fluid storage assembly, in time duration TA1;

step S132, loading the first fluid into a fluid-using system, in time duration TA2;

step S133, absorbing a second fluid from the fluid storage assembly, in time duration TB1;

step S134, loading the second fluid into the fluid-using system, in time duration TB2;

wherein the total time period T for transferring the first fluid and the second fluid from the fluid storage assembly to the fluid-using system is less than the sum of the TA1, TA2, TB1, and TB2.

Wherein, the TB1 at least partially overlaps the TA1 along the time axis, and/or, the TB1 at least partially overlaps the TA2 along the time axis. The TB1 and the TB2 do not overlap with each other along the time axis, the TA1 and the TA2 do not overlap with each other along the time axis, and the TB1 and the TB2 do not overlap with each other along the time axis.

Wherein, the first fluid and the second fluid are absorbed from the fluid storage assembly in a negative pressure driving manner by the power assembly, and/or, the first fluid and the second fluid are absorbed and loaded into the fluid-using system in a positive pressure driving manner by the power assembly.

Wherein, the first fluid and the second fluid may be the same fluid or different fluids, and the amount of the first fluid absorbed by the power assembly is the same as or can be different from that of the second fluid.

In conclusion, the fluid transportation system and the fluid transportation method provided by present disclosure, adopt a negative pressure driving mode to absorb fluids and adopt a positive pressure driving mode to input the absorbed fluids into a fluid-using system. These techniques ensure the quantitative accuracy of fluids taken out from a fluid storage assembly, while ensuring faster delivery of fluid to the fluid-using system.

In conclusion, the fluid transportation system and method provided by the present application can simultaneously employ at least two working modules: a first working module and a second working module, and the first working module and the second working module transport at least two fluids from a fluid storage assembly to a fluid-using system. The total time for the two working modules to transport the two fluids from the fluid storage assembly to the fluid-using system is T, the time required for the first working module to output a fluid out of the fluid storage assembly and input the fluid into the fluid-using system is TA, while the time required for the second working module to output another fluid from the fluid storage assembly and input the fluid into the fluid-using system is TB, and the T is less than the sum of TA and TB, resulting in a shorter overall time for fluid transportation. In addition, multiple working modules are set up to transport fluids in groups, which cross-contamination can be avoided to the maximum extent. Filling the pipe space left by positive pressure transportation with a filling liquid, compared to using a compressed gas, the quantitative accuracy of the fluid transportation is higher.

The above embodiments and examples all relate to the situation in which one or more working modules transport fluids to a fluid-using system through a distribution assembly, wherein there is a many-to-one mapping relationship between the working modules and the distribution assembly, and there is a one-to-one mapping relationship between the distribution assembly and the fluid-using system. However, in other embodiments, corresponding to M (M>1) fluid-using systems, L (L>1) distribution assemblies and N (N>1) working modules, there may be more complex mapping relationships. For example, multiple working modules may correspond to one distribution assembly, and one distribution assembly may correspond to multiple fluid using systems; multiple working modules may correspond to multiple distribution assemblies, and multiple distribution assemblies correspond to one fluid-using system. In any case, when multiple working modules correspond to one distribution assembly or one fluid-using system, since the fluids transported by the multiple working modules need to be sequentially transported to the fluid-using system, the working modules performing step 2 (inputting fluids into the fluid-using system) in sequence, and each working module performing step 1 (absorbing fluids into the fluid transfer assembly) simultaneously with step 1 and/or step 2 of one or more other working modules, thereby save overall time of multiple working modules for transporting fluids to the fluid-using system.

Figure 14:
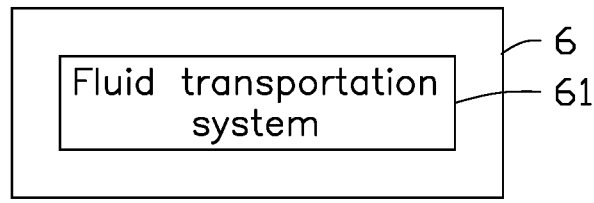
FIG. 14 is a block diagram of a fluid using device according to Embodiment V of the present disclosure.
Figure 15:
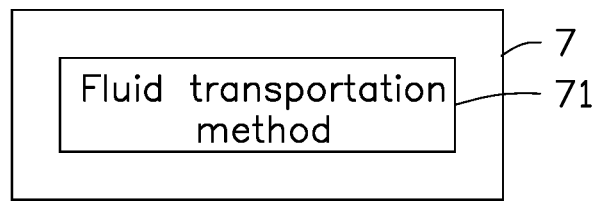
FIG. 15 is a block diagram of a fluid using device according to Embodiment VI of the present disclosure.

Referring to FIGS. 14 and 15, the present disclosure further provide fluid using devices 6 and 7 using a fluid transportation system and a fluid transportation method. The fluid using device 6 adopts at least one fluid transportation system 61 to transport fluids, and the fluid transportation system 61 may be the fluid transportation system provided by the above embodiments and examples of the present disclosure, or that provided by an extended system without departing from the spirit and scope of the present disclosure. The fluid using device 7 adopts at least one fluid transportation method 71 to transport fluids, and the fluid transportation method 71 may be the fluid transportation method provided by the above-described embodiments of the present disclosure, or that provided by an extended method without departing from the spirit and scope of the present disclosure. The fluid using devices 6 and 7 may be various devices or instruments using fluids, such as gene sequencers, liquid chromatographs, biochemical analyzers, medical instruments, and so on.

Finally, it should be noted that the above embodiments are only used to illustrate the technical solutions of the present disclosure and not to limit them. Although the present disclosure has been described in detail with reference to the preferred embodiments, those of ordinary skill in the art should understand that the technical solutions of the present disclosure may be modified or equivalently replaced without departing from the spirit and scope of the technical solutions of the present disclosure.

What is claimed is:

1. A fluid transportation system, wherein the fluid transportation system comprises at least two working modules and an auxiliary module, each of the at least two working modules comprises a fluid transfer assembly and a power assembly, the auxiliary module comprises a fluid storage assembly, a waste storage assembly, and a filling liquid storage assembly;

the fluid transportation system is configured to form a passage starting from the fluid storage assembly, the fluid transfer assembly, the power assembly and the waste storage assembly in sequence, the power assembly uses a negative pressure driving mode to absorb fluids from a fluid storage assembly to the fluid transfer assembly, the power assembly, and the waste storage assembly, and the fluid transfer assembly is configured to temporarily store the absorbed fluids from the fluid storage assembly;

the fluid transportation system is further configured to form a passage starting from the filling liquid storage assembly to the power assembly, the fluid transfer assembly, and a fluid-using system in sequence, and the power assembly further uses a positive pressure driving mode to load the absorbed fluids from the filling liquid storage assembly into the power assembly, the fluid transfer assembly, and the fluid-using system in sequence, when the fluids temporarily stored in the transfer assembly are absorbed into the fluid-using system, the filing liquid storage assembly is configured to provide a filling liquid to infill a space left after fluids transfer;

a total time period for the at least two working modules to transfer at least two fluids from the fluid storage assembly to the fluid-using system is less than a total time period for each of the at least two working modules to transfer one fluid from the fluid storage assembly to the fluid-using system.

2. The fluid transportation system of claim 1, wherein the power assembly is a syringe pump, a plunger pump, a diaphragm pump, a gear pump, or a peristaltic pump.

3. The fluid transportation system of claim 1, wherein the fluid transportation system further comprises a fluid selection assembly, the fluid selection assembly is configured to select a different one of the at least two fluids from the fluid storage assembly.

4. The fluid transportation system of claim 1, wherein a number of the fluid-using system is one or more, and the fluid transportation system further comprises a distribution assembly, the distribution assembly is configured to switch and connect a different one of the at least two working modules to the fluid-using system.

5. The fluid transportation system of claim 1, wherein the fluid transportation system further comprises at least two distribution assemblies, wherein each of the two distribution assemblies is configured to connect at least one of the at least two working modules to the fluid-using system.

6. The fluid transportation system of claim 1, wherein at least one working module of the at least two working modules is a syringe pump; and/or, at least one working module of the at least two working modules comprises a fluid selection assembly configured to select a different one of the fluids from the fluid storage assembly.

7. The fluid transportation system of claim 1, wherein the at least two working modules comprises a first working module and a second working module, a time period required for the first working module to absorb a fluid from the fluid storage assembly and load the fluid into the fluid-using system is denoted as TA, a time period required for the second working module to absorb another fluid from the fluid storage assembly and load the fluid into the fluid-using system is denoted as TB, and a total time period for the first working module and the second working module to transport the two fluids from the fluid storage assembly to the fluid-using system is denoted as T, wherein T<TA+TB.

8. The fluid transportation system of claim 1, wherein the at least two working modules comprises a first working module and a second working module, a time period taken by the first working module to absorb a fluid from the fluid storage assembly and temporarily store in a fluid transfer assembly of the first working module is denoted as TA1, a time period taken by the first working module to load the fluid from the fluid transfer assembly into the fluid-using system is denoted as TA2, a time period taken by the second working module to absorb a fluid from the fluid storage assembly and to temporarily store in a fluid transfer assembly in the second working module is denoted as TB1, and a time period taken by the second working module to load the fluid from the fluid transfer assembly into the fluid-using system is denoted as TB2, wherein the TB1 at least partially overlaps the TA1 along a time axis, and/or, the TB1 at least partially overlaps the TA2 along the time axis.

9. The fluid transportation system of claim 8, wherein the TB1 and the TB2 do not overlap with each other along the time axis, the TA1 and the TA2 do not overlap with each other along the time axis, and the TA2 and the TB2 do not overlap with each other along the time axis.

10. A fluid transportation method, comprising:
absorbing fluids by a negative pressure driving mode; and
loading the absorbed fluids into a fluid-using system by a positive pressure driving mode;
wherein absorbing the fluids by the negative pressure driving mode comprises:
establishing connection among a power assembly, a fluid transfer assembly, a fluid storage assembly, and a waste storage assembly, running the power assembly to absorb the fluids from the fluid storage assembly into the fluid transfer assembly, the power assembly, and the waste storage assembly in sequence and temporarily store the fluids in the fluid transfer assembly;
and blocking the connection among the power assembly, the fluid transfer assembly, and the fluid storage assembly;
wherein loading the absorbed fluids by the positive pressure driving mode comprises:
establishing connection among a filling liquid storage assembly, the power assembly, the fluid transfer assembly and the fluid-using system, and running the power assembly to load fluids from the filling liquid storage assembly into the power assembly, the fluid transfer assembly, and the fluid-using system in sequence, and to load fluids temporarily stored in the fluid transfer assembly to flow into the fluid-using system.

11. The fluid transportation method of claim 10, wherein absorbing the fluids by the negative pressure driving mode comprises:
step a) establishing connection between a first working module and the fluid storage assembly, running the first working module to absorb the fluids from the fluid storage assembly, and blocking the connection between the first working module and the fluid storage assembly after completion; and
step b) establishing connection between a second working module and the fluid storage assembly or another fluid storage assembly, running the second working module to absorb fluids from the fluid storage assembly or the other fluid storage assembly, and blocking the connection between the second working module and the fluid storage assembly or the another fluid storage assembly after completion.

12. The fluid transportation method of claim 11, wherein loading the fluids by the positive pressure driving mode comprises:
step c) establishing connection between the first working module and the fluid-using system, and running the first working module to load the absorbed fluids into the fluid-using system; and
step d) establishing connection between the second working module and the fluid-using system or another fluid-using system, and running the second working module to load the absorbed fluids into the fluid-using system or the another fluid-using system.

13. The fluid transportation method of claim 12, wherein execution of the step b) at least partially overlaps execution of the step a) along the time axis, and/or, the execution of the step b) at least partially overlaps execution of the step c) along the time axis.

14. The fluid transportation method of claim 12, wherein a total time period required for performing the steps a), b), c), and d) is denoted as T, a time period required for performing the step a) is TA1, a time period required for performing the step b) is TB1, a time period required for performing the step c) is denoted as TA2, and a time period required for performing the step d) is denoted as TB2, wherein T<TA1+TA2+TB1+TB2.

15. The fluid transportation method of claim 12, wherein the first working module and the second working module both transport the fluids to the same fluid-using system, and the step c) comprises: connecting the first working module and the fluid-using system through a distribution assembly, and running the first working module to load the absorbed fluids into the fluid-using system; and the step d) comprises: connecting the second working module and the fluid-using system through the distribution assembly or another distribution assembly, and running the second working module to load the absorbed fluids into the fluid-using system.

16. The fluid transportation method of claim 12, wherein the first working module and the second working module respectively transport fluids to different fluid-using systems, and the step c) comprises: connecting the first working module and the fluid-using system through a distribution assembly, and running the first working module to load the absorbed fluids into the fluid-using system; and the step d) comprises: connecting the second working module and the another fluid-using system through the distribution assembly, and running the second working module to load the absorbed fluids into the another fluid-using system.

17. The fluid transportation method of claim 12, wherein a total time period for the first working module and the second working module to transfer fluids from the fluid storage assembly or the another fluid storage assembly to the fluid-using system or the another fluid-using system is less than a sum of the time period spent by the first working module and the second working module respectively in transferring fluids from the fluid storage assembly or the another fluid storage assembly to the fluid-using system or the another fluid-using system.

18. A fluid using device, wherein the fluid using device uses a fluid transportation system to transport fluids, the fluid transportation system comprises at least two working modules and an auxiliary module, each of the at least two working modules comprises a fluid transfer assembly and a power assembly, the auxiliary module comprises a fluid storage assembly, a waste storage assembly, and a filling liquid storage assembly;

the fluid transportation system is configured to form a passage starting from the fluid storage assembly, the fluid transfer assembly, the power assembly and the waste storage assembly in sequence, the power assembly uses a negative pressure driving mode to absorb fluids from a fluid storage assembly to the fluid transfer assembly, the power assembly, and the waste storage assembly, and the fluid transfer assembly is configured to temporarily store the absorbed fluids from the fluid storage assembly;

the fluid transportation system is further configured to form a passage starting from the filling liquid storage assembly to the power assembly, the fluid transfer assembly, and a fluid-using system in sequence, and the power assembly further uses a positive pressure driving mode to load the absorbed fluids from the filling liquid storage assembly into the power assembly, the fluid transfer assembly, and the fluid-using system in sequence, when the fluids temporarily stored in the transfer assembly are absorbed into the fluid-using system, the filing liquid storage assembly is configured to provide a filling liquid to infill a space left after fluids transfer;

a total time period for the at least two working modules to transfer at least two fluids from the fluid storage assembly to the fluid-using system is less than a total time period for each of the at least two working modules to transfer one fluid from the fluid storage assembly to the fluid-using system.

* * * * *